US011079652B2

(12) United States Patent
Abouraddy et al.

(10) Patent No.: US 11,079,652 B2
(45) Date of Patent: Aug. 3, 2021

(54) OMNIRESONANT BROADBAND COHERENT PERFECT ABSORPTION (CPA) APPARATUS, METHOD, AND APPLICATIONS

(71) Applicant: UNIVERSITY OF CENTRAL FLORIDA RESEARCH FOUNDATION, INC., Orlando, FL (US)

(72) Inventors: Ayman F. Abouraddy, Orlando, FL (US); Ali Kazemi Jahromi, Orlando, FL (US); Massimo L. Villinger, Orlando, FL (US); Ahmed El Halawany, Orlando, FL (US); Soroush Shabahang, Orlando, FL (US); Hasan Esat Kondakci, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 411 days.

(21) Appl. No.: 16/119,348

(22) Filed: Aug. 31, 2018

(65) Prior Publication Data
US 2019/0064629 A1 Feb. 28, 2019

Related U.S. Application Data

(60) Provisional application No. 62/552,544, filed on Aug. 31, 2017.

(51) Int. Cl.
*G02F 1/03* (2006.01)
*G02B 26/00* (2006.01)
(Continued)

(52) U.S. Cl.
CPC .............. *G02F 1/21* (2013.01); *G02F 1/0126* (2013.01); *G02F 1/213* (2021.01); *G02F 2203/05* (2013.01); *G02F 2203/15* (2013.01)

(58) Field of Classification Search
CPC .............................. G02B 26/001; B82Y 20/00
(Continued)

(56) References Cited

U.S. PATENT DOCUMENTS 9,740,031 B2     8/2017  Abouraddy et al.

OTHER PUBLICATIONS

Pfeifle, J. et al., "Coherent terabit communications with microresonator Kerr frequency combs," Nature Photon. 8, 375-380 (2014).
(Continued)

*Primary Examiner* — Dawayne Pinkney
(74) *Attorney, Agent, or Firm* — George McGuire

(57) ABSTRACT

The present disclosure is directed to systems and methods for omniresonant broadband coherent perfect absorption of incoherent light over large bandwidths. The apparatus and methods that enable 100% effective optical absorption in a structure, irrespective of the material from which it is constructed, over a large, continuous bandwidth (omniresonance) in ultrathin devices. Specifically, we demonstrate achromatic optical absorption (omniresonance) in a planar Fabry-Pérot micro-cavity via angularly multiplexed phase-matching. By assigning each wavelength to an appropriate angle of incidence, the micro-cavity is rendered absorbing with continuous spectral range. For example, the linewidth of a single-order 0.7 nm wide resonance is de-slanted in spectral-angular space to become a 70 nm wide achromatic resonance spanning multiple cavity free spectral ranges. The embodied invention can have important applications in, e.g., harvesting solar energy, white-light micro-lasers, and other broadband resonantly enhanced optical effects.

8 Claims, 17 Drawing Sheets

(51) Int. Cl.
*G02F 1/01* (2006.01)
*G02F 1/21* (2006.01)

(58) Field of Classification Search
USPC .............. 359/245, 237, 240, 247, 261, 263
See application file for complete search history.

(56) References Cited

OTHER PUBLICATIONS

Diddams, S.A., Tet al., "An optical clock based on a single trapped 199Hg+ ion," Science 293, 825-293 (2001).
Abbott, B.P., et al., "LIGO: The laser interferometer gravitational-wave observatory," Rep. Prog. Phys. 72, 076901 (2009).
Wicht, A., et al., "White-light cavities, atomic phase coherence, and gravitational wave detectors," Opt. Commun. 134, 431-439 (1997).
Pati, G.S., et al., "Demonstration of a tunable-bandwidth white-light interferometer using anomalous dispersion in atomic vapor," Phys. Rev. Lett. 99, 133601 (2007).
Wu, H., et al., "White-light cavity with competing linear and nonlinear dispersions," Phys. Rev. A 77, 031801 (2008).
Yum, H.N., et al., "Demonstration of white light cavity effect using stimulated Brillouin scattering in a fiber loop," J. Lightwave Technol. 31, 3865-3872 (2013).
Vigneron, J.P., et al., "Reverse color sequence in the diffraction of white light by the wing of the male butterfly *Pierella luna* (Nymphalidae: Satyrinae)," Phys. Rev. E 82, 021903 (2010).
England, G., et al., "Bioinspired micrograting arrays mimicking the reverse color diffraction elements evolved by the butterfly *Pierella luna*," Proc. Natl. Acad. Sci. USA 111, 15630-15634 (2014).
Makri, E., et al., "Concept of a reflective power limiter based on nonlinear localized modes," Phys. Rev. A 89, 031802 (R) (2014).
Szipöcs, R., et al., "Chirped multilayer coatings for broadband dispersion control in femtosecond lasers," Opt. Lett. 19, 201-203 (1994).
Wise, S., et al., "Linewidth-broadened Fabry-Perot cavities within future gravitational wave detectors," Class. Quantum Grav. 21, S1031-S1036 (2004).
Yum, H.N., et al., "The fundamental limitations on the practical realizations of white light cavities," Opt. Commun. 305, 260-266 (2013).
Wise, S., et al., "Phase effects in the diffraction of light: Beyond the grating equation," Phys. Rev. Lett. 95, 013901 (2005).
Aieta, F., et al., "Multiwavelength achromatic metasurfaces by dispersive phase compensation," Science 347, 1342-1345 (2015).
Palmer, C., Diffraction Grating Handbook (Newport, Rochester, New York, 2005).
Yu, N., et al., "Flat optics with designer metasurfaces," Nat. Mater. 13, 139-150 (2014).
High, A.A., et al., "Visible-frequency hyperbolic metasurface," Nature 522, 192-196 (2015).
Imenes A.G, et al., "Spectral beam splitting technology for increased conversion efficiency in solar concentrating systems: A review," Sol. Energ. Mat. Sol. Cells 84, 19-69 (2004).
Kagalwala, K.H., et al., "Bell's measure in classical optical coherence," Nature Photon. 7, 72-78 (2013).
S. Berg-Johansen, S., et al., "Classically entangled optical beams for high-speed kinematic sensing," Optica 2, 864-868 (2015).
Chong, Y.D., et al., "Coherent Perfect Absorbers: Time-Reversed Lasers," Phys. Rev. Lett. 105(5), 053901 (2010).
Wan, W. et al., "Time-Reversed Lasing and Interferometric Control of Absorption," Science 331(6019), 889-892 (2011).
Papaioannou, M., et al., "All-optical multichannel logic based on coherent perfect absorption in a plasmonic metamaterial," APL Photonics 1(9), 090801 (2016).
Rao, S.M., et al., "Coherent control of light interaction with graphene," Opt. Lett. 39(18), 5345-5347 (2014).
Roger T., et al., "Coherent perfect absorption in deeply subwavelength films in the single-photon regime," Nat. Commun. 6, 7031 (2015).
Rothenberg, J.M., et al., "Experimental demonstration of coherent perfect absorption in a silicon photonic racetrack resonator," Opt. Lett. 41(11), 2537-2540 (2016).
Fannin, A.L., et al., "Experimental evidence for coherent perfect absorption in guided-mode resonant silicon films," IEEE Photon. J. 8(3), 6802307 (2016).
Zhao H., et al., "Metawaveguide for asymmetric interferometric light-light switching," Phys. Rev. Lett. 117(19), 193901 (2016).
Papaioannou, M., et al., "Two-dimensional control of light with light on metasurfaces," Light: Science and Applications 5, e16070 (2016).
Fang, X., et al., "Ultrafast all-optical switching via coherent modulation of metamaterial absorption," Appl. Phys. Lett. 104(14), 141102 (2014).
Villinger, M.L., et al., "Analytical model for coherent perfect absorption in one-dimensional photonic structures," Opt. Lett 40(23), 112-120 (2015).
Pye, et al., "Octave-spanning coherent perfect absorption in a thin silicon film," Opt. Lett. 42(1), 151-154 (2017).
Furchi, M., et al., "Microcavity-integrated graphene photodetector," Nano Lett. 12(6), 2773-2777 (2012).
Zhu, L., et al., "Angle-selective perfect absorption with two-dimensional materials," Light Sci. Appl. 5, e16052 (2016).
Zhao, Wangshi, et al., "Greatly enhanced ultrabroadband light absorption by monolayer graphene," Opt. Lett. 38(21), 4342-4345 (2013).
Pirruccio, G., et al., "Coherent and broadband enhanced optical absorption in graphene," ACS Nano 7(6), 4810-4817 (2013).
Thareja, V., et al, "Electrically tunable coherent optical absorption in graphene with ion gel," Nano Lett. 15(3), 1570-1576 (2015).
Jang, M.S., et al., "Tunable large resonant absorption in a midinfrared graphene salisbury screen," Phys. Rev. B. 90(16), 165409 (2014).
Ying, X., et al., "Enhanced universal absorption of graphene in a Salisbury screen," J. Appl. Phys. 121(2), 023110 (2017).
Woo, J.M., et al., "Graphene based salisbury screen for terahertz absorber," Appl. Phys. Lett. 104(8), 081106 (2014).
Kakenov, N., et al., "Observation of gate-tunable coherent perfect absorption of terahertz radiation in graphene," ACS Photonics 3(9), 1531-1535 (2016).
Roger, T., et al., "Coherent Absorption of N00N States," Phys. Rev. Lett. 117(2), 023601 (2016).
Yao, Y., et al., "Electrically tunable metasurface perfect absorbers for ultrathin mid-infrared optical modulators," Nano Lett. 14(11), 6526-6532 (2014).
Liu, Y., et al. "Approaching total absorption at near infrared in a large area monolayer graphene by critical coupling," Appl. Phys. Lett. 105(18), 181105 (2014).
Grande, M. et al., "Graphene-based absorber exploiting guided mode resonances in one-dimensional gratings," Opt. Express 22(25), 31511-31519 (2014).
Grande, M., et al., "Graphene-based perfect optical absorbers harnessing guided mode resonances," Opt. Express 23(16), 21032-21042 (2015).

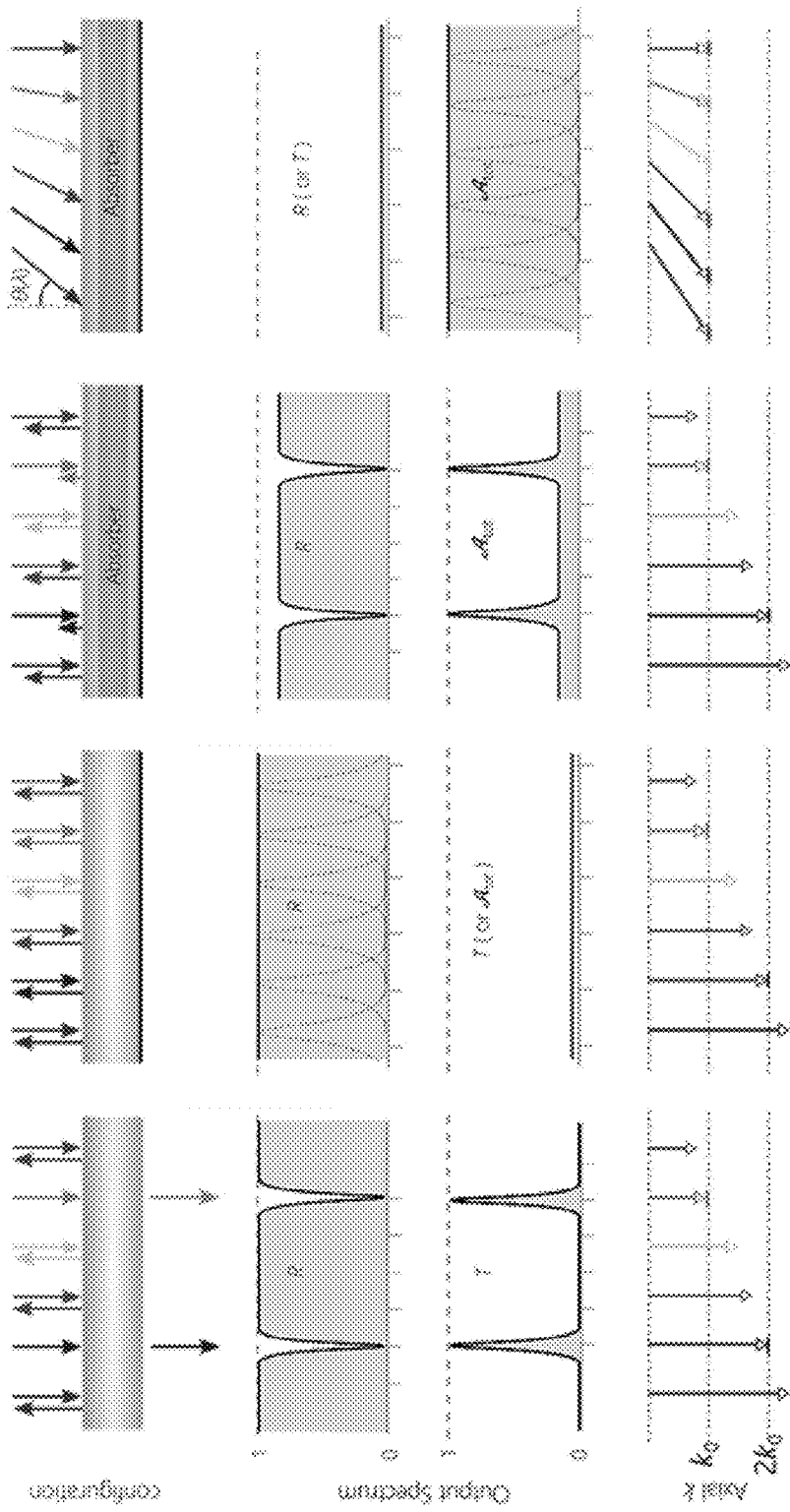

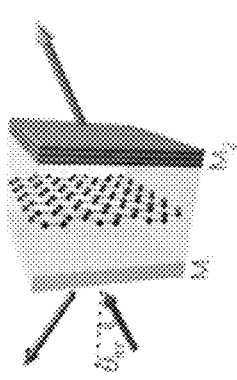
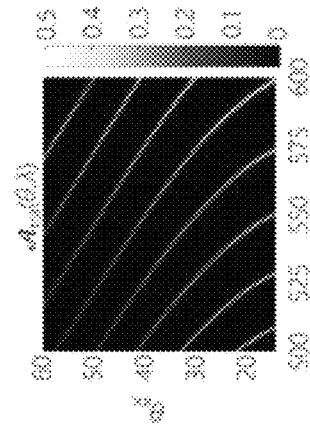
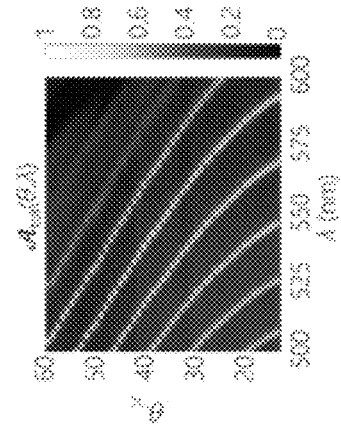
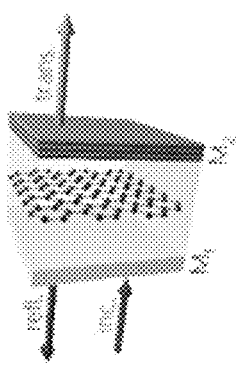
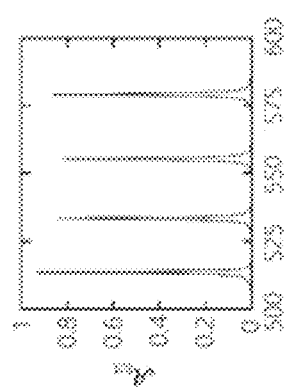
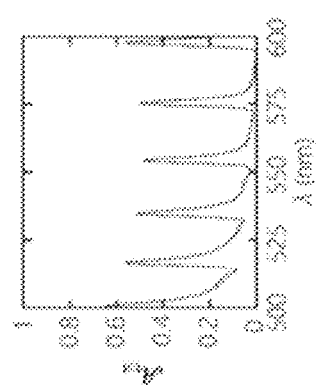
FIG. 3(a)
FIG. 3(b)
FIG. 3(c)

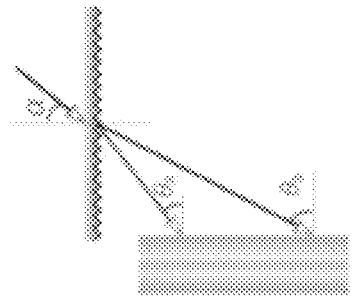
FIG. 9(a)
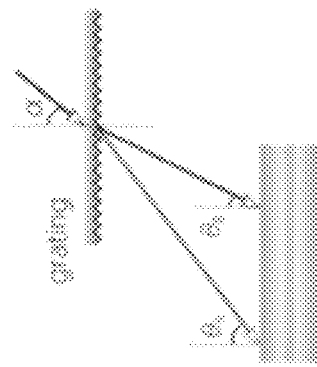
FIG. 9(b)
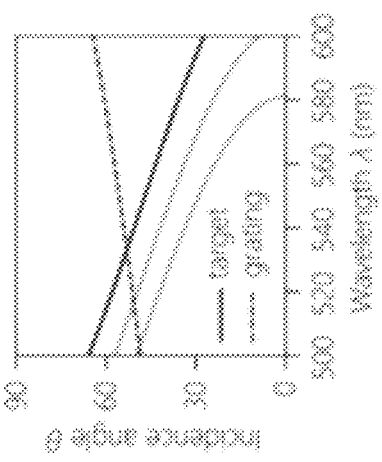
FIG. 9(c)
FIG. 9(d)
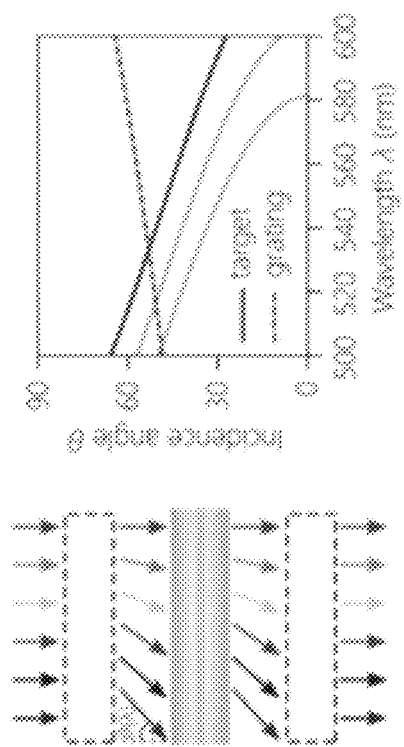
FIG. 9(e)

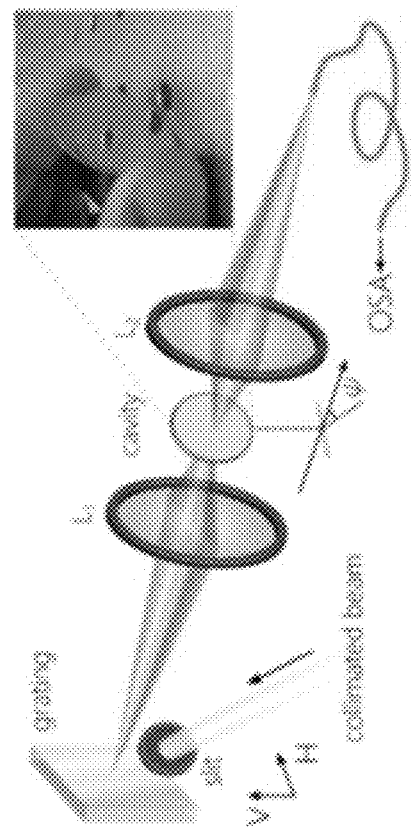
FIG. 10(a)
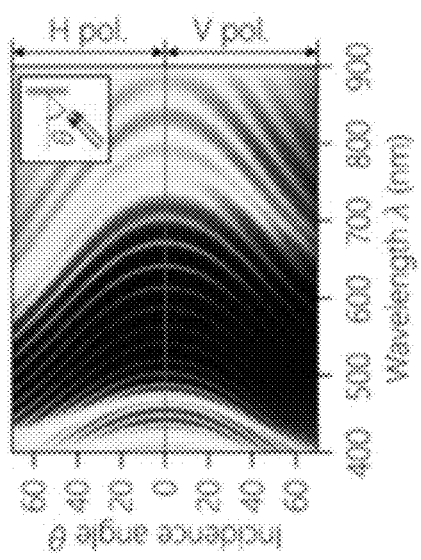
FIG. 10(c)
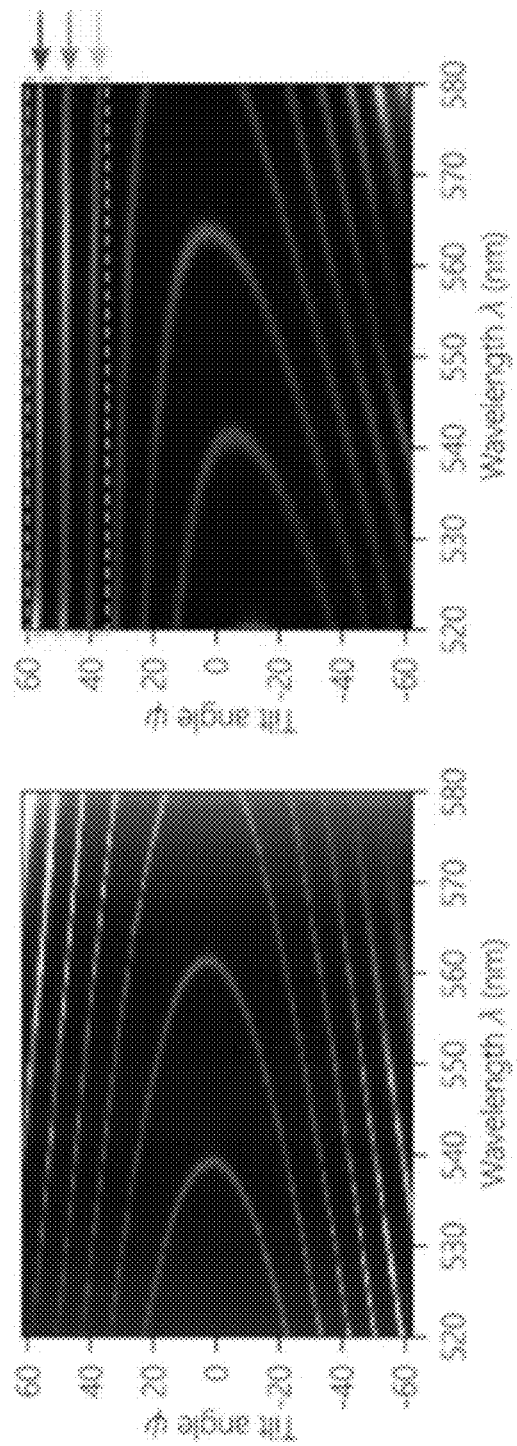
FIG. 10(b)
FIG. 10(d)

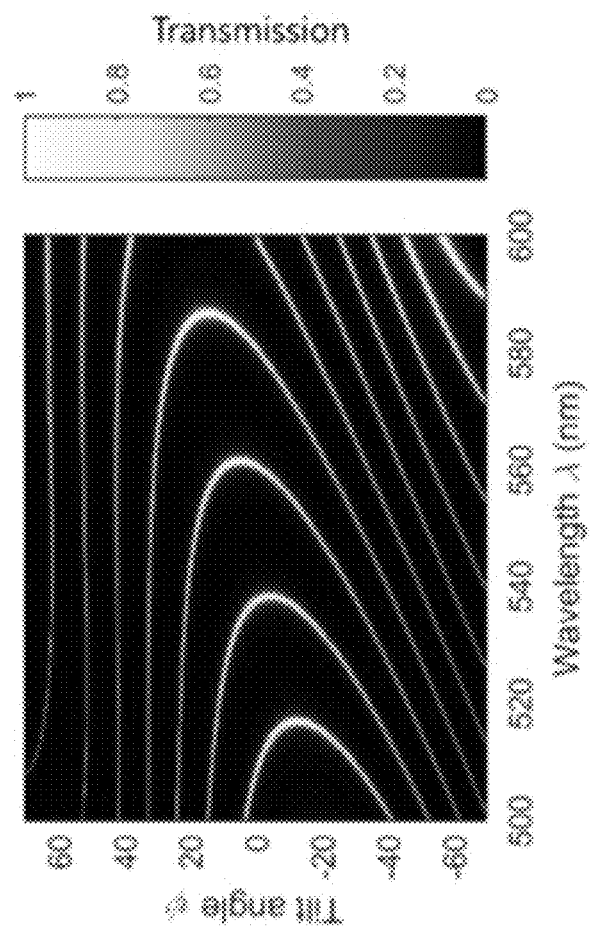
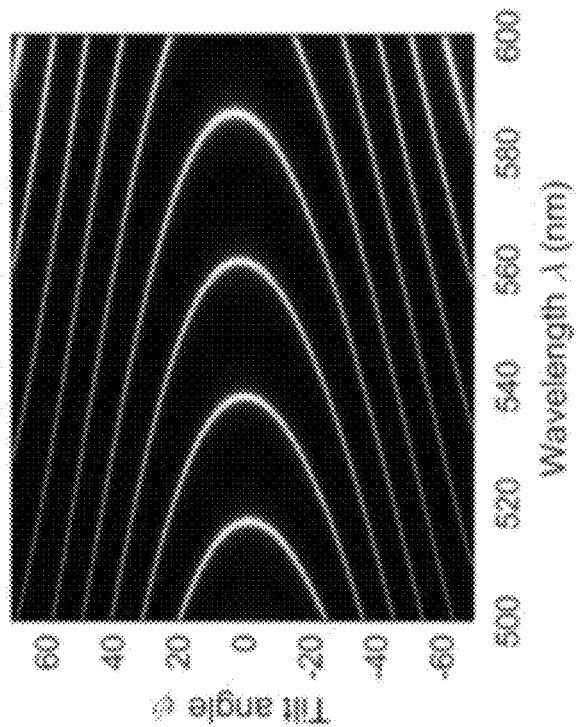
FIG. 16(a)
FIG. 16(b)

OMNIRESONANT BROADBAND COHERENT PERFECT ABSORPTION (CPA) APPARATUS, METHOD, AND APPLICATIONS

CROSS-REFERENCE TO RELATED APPLICATIONS

This application claims priority to U.S. Provisional Patent Application Ser. No. 62/552,544, filed on Aug. 31, 2017 and entitled "Omniresonant Broadband Coherent Perfect Absorption (CPA) Apparatus, Method, and Applications," the entirety of which is incorporated herein by reference.

GOVERNMENT FUNDING

This invention was made with Government support by the US Air Force Office of Scientific Research AFOSR MUM contract FA9550-14-1-0037. The United States Government has certain rights in the invention.

BACKGROUND OF THE INVENTION

1. Field of the Invention

The present disclosure is directed generally to omniresonant broadband coherent perfect absorption of incoherent light over large bandwidths in optical apparatus or systems and, more particularly, to systems and methods for obtaining achromatic optical absorption (omniresonance spanning greater than 50 nm, continuous coherent perfect absorption).

2. Description of Related Art

Coherent perfect absorption (CPA) refers to completely absorbing light in a partial absorber placed in a devised medium. The essence of this concept is maximizing the interaction of an incoming optical field and the absorber by engineering the electromagnetic field distribution. Since such an interaction takes place via interference, CPA is a resonant phenomenon that occurs only at discrete wavelengths. CPA was initially proposed and realized by placing a symmetric 1D absorbing layer in the standing wave of two counterpropagating beams. In this two-sided-incidence configuration, CPA is observed at discrete wavelengths upon satisfaction of a phase relation between the two beams. Asymmetric planar cavities were proposed and realized to demonstrate CPA under one-sided-incidence configurations. Such cavities consist of a perfect back-mirror $R_2=1$, and a front-mirror with a reflectivity $R_1=(1-\mathcal{A})^2$, with $\mathcal{A}$ being the single-pass absorption of the lossy material.

CPA is applicable to any absorbing medium since it is agnostic about the nature of the absorber. However, it suffers from two major constraints that severely limit the potential applications: (1) CPA is a resonant effect and hence occurs only at a limited linewidth around resonant wavelengths; and (2) since the intrinsic absorption of a material is wavelength-dependent, CPA occurs within a narrow bandwidth where the material's absorption and the Fresnel reflections meet the CPA requirement (i.e., a 3-nm bandwidth has been reported). The latter issue is resolved by devising mirrors that counterbalance the variations in the material's intrinsic absorption, $R_1(\lambda)=(1-\mathcal{A}(\lambda))^2$.

However, the issue of narrow absorption linewidth has so far remained unsolved, which hinders CPA for efficiently capturing optical energy. For example, CPA in graphene has been reported in various configurations such as attenuated total internal reflection (ATR), Salisbury screen, two-beam illumination, single-beam illumination, and guided-mode resonance coupling, but the demonstrations are made at discrete wavelengths with a limited linewidth, and efforts for broadening the absorption linewidths are lacking a clear strategy. For a solar cell, a device needs to absorb the incoming light continuously across a broad range of wavelengths. Therefore, there is a need for a system and method of CPA of incoherent light over large bandwidths.

Further, optical-cavity resonances occupy narrow spectral linewidths that are inversely proportional to the cavity-photon lifetime, which are separated by a free spectral range (FSR) that is inversely proportional to the cavity size. Although cavity-quantum electrodynamics requires narrow cavity linewidths to isolating the interaction of optical fields with the resonances of atoms, ions, or nanostructures, most applications would benefit from maintaining the resonant cavity field buildup over an extended bandwidth. Examples of such applications include coherent perfect absorption (CPA) in media endowed with low intrinsic losses and boosting nonlinear optical effects. Although CPA, for instance, can increase absorption to 100% in a thin low-loss layer on resonance, exploiting CPA in harvesting solar radiation would require an optical cavity in which an extended bandwidth satisfies the resonance condition.

The quest for producing an achromatic resonator has precedents. In "white-light cavities," the cavity itself is modified by inserting a new material or structure endowed with strong negative (anomalous) dispersion to equalize the cavity optical length for all wavelengths. Only macroscopic white-light cavities have been explored to date via cavity-filling atomic species featuring bifrequency Raman gain in a double-Λ system or displaying electromagnetically induced transparency, or alternatively via nonlinear Brillouin scattering. In all such studies, the enhanced cavity linewidths are extremely narrow (~100 MHz or <1-pm-wide) by virtue of the very nature of the atomic or nonlinear resonances utilized, and are limited by uncompensated higher-order dispersion terms. Alternative approaches based on the use of linear optical components, such as appropriately designed chirped cavity mirrors or grating pairs, have been investigated. Surprisingly, both of these possibilities fail at producing a white-light cavity due to subtle overlooked aspects in the constraints imposed by causality on non-dissipative systems. Therefore there is a need for system and method for achromatic transmission through a white-light cavity.

SUMMARY OF THE INVENTION

The present disclosure is directed to systems and methods for obtaining achromatic optical absorption.

According to one aspect, the present invention is an omniresonant broadband coherent perfect absorption (CPA) apparatus. The omniresonant broadband CPA apparatus includes a light diffracting component, a lens $L_1$, and an omniresonant optical cavity, disposed along an optical axis. The omniresonant optical cavity is disposed tilted at an angle, $\psi$, with respect to the optical axis and an angle $\gamma^{(\lambda)}$ is a diffraction angle of a white-light input to the diffraction component with respect to a light diffracting component normal. $\gamma^{(\lambda)}-\gamma_o$ is the angle that any wavelength λ makes with respect to the optical axis and a central wavelength $\lambda_c$ is diffracted at $\gamma_o=\gamma(\lambda_c=550$ nm) and coincides with the optical axis. In addition, the incidence angle made by the wavelength λ after the lens with respect to the optical axis is $$\varphi(\lambda) = \tan^{-1}\left\{\frac{d_1}{d_2}\tan(\gamma(\lambda) - \gamma_o)\right\},$$

where $d_1$ and $d_2$ are the distances from the light diffracting component to the lens $L_1$ and from the lens $L_1$ to the cavity, respectively, such that the condition $\theta(\lambda) = \varphi(\lambda) + \psi$ is satisfied.

According to another aspect, the present invention is a method for omniresonant transmission, comprising the steps of: (i) providing an omniresonant broadband apparatus having a light diffracting component, a lens $L_1$, and an omniresonant optical cavity, disposed along an optical axis, wherein the omniresonant optical cavity is disposed tilted at an angle, $\psi$, with respect to the optical axis; (ii) inputting a white-light input to the diffraction component with respect to a light diffracting component normal having a diffraction angle $\gamma^{(\lambda)}$; wherein $\gamma^{(\lambda)} - \gamma_o$ is the angle that any wavelength $\lambda$ makes with respect to the optical axis, and (iii) diffracting a central wavelength $\lambda_c$ at $\gamma_o = \gamma(\lambda_c = 550\ nm)$, which coincides with the optical axis, wherein the incidence angle made by the wavelength $\lambda$ after the lens with respect to the optical axis is $$\varphi(\lambda) = \tan^{-1}\left\{\frac{d_1}{d_2}\tan(\gamma(\lambda) - \gamma_o)\right\},$$

where $d_1$ and $d_2$ are the distances from the light diffracting component to the lens $L_1$ and from the lens $L_1$ to the cavity, respectively, such that the condition $\theta(\lambda) = \varphi(\lambda) + \psi$ is satisfied.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 1(A) is a graph showing the spectral-angular correlation for satisfying the broadband CPA;

FIG. 1(B) is a graph showing the spectral-angular correlation for satisfying the broadband CPA;

FIG. 1(C) is a graph showing the spectral-angular correlation for satisfying the broadband CPA;

FIG. 1(D) is a graph showing the spectral-angular correlation for satisfying the broadband CPA;

FIG. 3(A) shows graphs of spectral feature of the graphene CPA cavity;

FIG. 3(B) shows graphs of spectral feature of the graphene CPA cavity;

FIG. 3(C) shows graphs of spectral feature of the graphene CPA cavity;

FIG. 9(A) is a diagram of angularly multiplexed phase-matching to produce an achromatic resonance;

FIG. 9(B) is a graph of angularly multiplexed phase-matching to produce an achromatic resonance;

FIG. 9(C) is a diagram of angularly multiplexed phase-matching to produce an achromatic resonance;

FIG. 9(D) is a diagram of angularly multiplexed phase-matching to produce an achromatic resonance;

FIG. 9(E) is a graph of angularly multiplexed phase-matching to produce an achromatic resonance;

FIG. 10(A) is a diagram of achromatic resonances in a Fabry-Pérot micro-cavity;

FIG. 10(B) is a diagram of achromatic resonances in a Fabry-Pérot micro-cavity;

FIG. 10(C) is a graph of achromatic resonances in a Fabry-Pérot micro-cavity;

FIG. 10(D) is a graph of achromatic resonances in a Fabry-Pérot micro-cavity;

FIG. 16(A) is a graph showing the spectral transmission through an achromatic resonator for TE polarization while varying the cavity tilt angle ψ;

FIG. 16(B) is a graph showing the spectral transmission through an achromatic resonator for TE polarization while varying the cavity tilt angle ψ;

DETAILED DESCRIPTION OF THE INVENTION

Figure 2A:
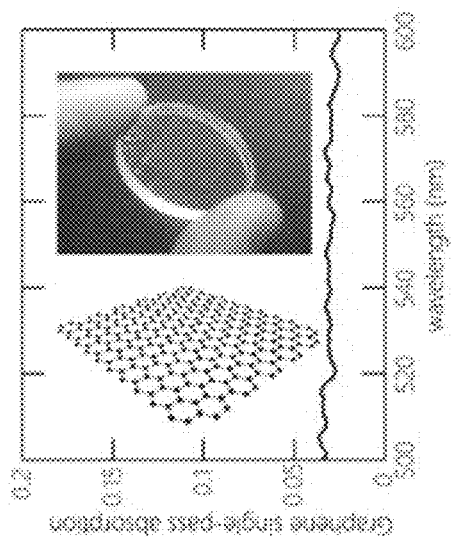
FIG. 2(A) is a graph of the cavity parameters.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

The underlying physics for realization of a broadband CPA is the concept of omniresonance in a lossless cavity, as discussed above and shown in FIGS. 1(a)-(d). FIGS. 1(a)-(d) show the engineering spectral-angular correlation for satisfying the broadband CPA. FIG. 1(a) shows a collimated broadband light is incident on a passive symmetric Fabry-Perot cavity (FIG. 1(a), first row) that transmits light at resonant wavelengths and reflects light otherwise (FIG. 1(a), second and third rows). The wavelengths for which the axial wave vector is multiple integer of are resonating with the cavity (FIG. 1(a), fourth row). Thus, a lossless symmetric cavity exhibits resonances that are signified by spectral peaks in transmission and dips in reflection (FIG. 1(a)). Similarly, a lossless asymmetric Fabry-Perot cavity with a perfect back-reflector contains spectral resonances, even though the flat reflection band, $R_{tot}=1$, masks the resonance features. Nevertheless, the resonances are revealed if one were to measure the phase in reflection (FIG. 1(b)). FIG. 1(b) shows the same as FIG. 1(a) but with a passive asymmetric Fabry-Perot cavity with a perfect back-mirror (FIG. 1(b), first row), thus exhibiting a flat unity reflectivity (FIG. 1(b), second row) with zero transmission (FIG. 1(b), third row). Resonant wavelengths are also the same as in FIG. 1(a) (FIG. 1(b), fourth row); however, those discrete wavelengths are not distinguishable in the reflection spectrum since the cavity back-mirror guarantees unity reflectivity for all wavelengths.

By embedding a weak absorber inside the cavity and properly choosing the front mirror design, the cavity exhibits perfect absorption, but only at discrete resonant wavelengths (FIG. 1(c)). Specifically, by inserting a low-absorption material inside the passive cavity in FIG. 1(b) and a proper choice of the front mirror reflectivity (FIG. 1(c), first row), CPA occurs at resonant wavelengths, resulting in spectral reflection dips (FIG. 1(c), second row) while a slight absorption is observed at other wavelengths (FIG. 1(c), third row).

For an angled incidence, the resonant wavelengths are determined by satisfaction of the following condition on the round-trip phase φ:

$$\varphi(\lambda) = \frac{4\pi nd}{\lambda}\cos\theta' + \alpha_1(\lambda) + \alpha_2(\lambda) = 2m\pi,$$

where λ is the free-space wavelength, θ is the angle of incidence inside the cavity corresponding to an external incidence angle θ through Snell's law, n and d are the refractive index and the thickness of the cavity layer, respectively, integer m is the resonant-mode order, and $\alpha_1$ and $\alpha_2$ are the reflection phases from the cavity mirrors. Since only axial components of wave-vectors contribute to the phase, it is possible to impose a condition on θ for any given λ, such that all wavelengths satisfy the resonance condition:

$$\varphi(\theta, \lambda) = \frac{4\pi nd}{\lambda}\cos\theta'(\lambda) + \alpha_1(\lambda) + \alpha_2(\lambda) = 2m\pi.$$

Upon satisfaction of the resonant condition for all wavelengths—which is a necessary CPA condition—broadband perfect absorption is achieved (FIG. 1(d)). Specifically, FIG. 1(d) shows a design where the incident angle (theta) of each wavelength (lambda) is properly chosen (FIG. 1(d), first row), all wavelengths resonate with the cavity, and thus, CPA occurs for the broadband incident light (FIG. 1(d), second and third rows). In this case, the condition on axial wave vectors is satisfied for all wavelengths (FIG. 1(d), fourth row). Note that the nature of the incoming light (such as bandwidth, central frequency, and coherence length) and the nature of the optical absorption are irrelevant. As a result, hypothetically, a broadband CPA in a weak absorber is plausible upon satisfying the following conditions: (1) a front mirror with wavelength-dependent reflectivity is designed to spectrally match absorption of the partially absorbing material, and (2) a judiciously wavelength-angle correlation is pre-arranged to have all the spectral components resonating with the cavity. The construction of the correlation by combination of a diffraction grating and a spherical lens is described in detail below.

CPA Cavity Structural Design

A nonlimiting embodiment of the present invention utilizes a graphene cavity that continuously absorbs visible light across a ~100-nm bandwidth. The concept of the CPA with an omniresonance configuration that used for omniresonant transmission is used in a CPA cavity. An omniresonant cavity refers to a cavity configuration for which the incident angle is correlated to wavelength components of the incoming beam, such that all the wavelengths become resonating within the cavity. Consequently, if an absorber is placed inside this cavity with properly devised mirror reflectivities, CPA is satisfied for all wavelengths, thus the beam is absorbed in a broad bandwidth (i.e., achromatic).

Figure 2B:
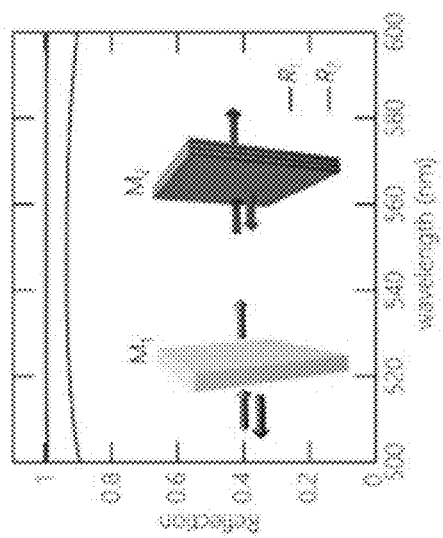
FIG. 2(B) is a graph of the cavity parameters.
Figure 2C:
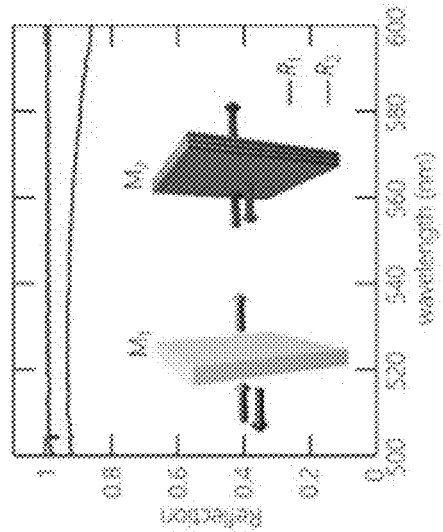
FIG. 2(C) is a graph of the cavity parameters.

For a graphene monolayer, which is an exemplary absorbing material, the single-pass absorption spectrum is flat within a somewhat broad range (FIG. 2(a)). (FIG. 2(a) shows a spectrum of single-pass absorption of graphene monolayer. The inset shows a graphene schematic and a glass substrate with graphene layer on top). This allows for convenient design of a front Bragg mirror with virtually flat spectral reflectivity, while the back-mirror is another Bragg mirror with more layers to give an almost perfect reflection (FIG. 2(b)). Thus, the optical cavity 200 has a CPA-inducing front mirror spaced from a fully reflective back mirror, both of which are bilayer Bragg mirrors. According to this embodiment, a 0.35-nm-thick graphene film is enclosed between a 100 nm front SiO2 dielectric cover layer and a 4-μm-thick back SiO2 dielectric spacer, sandwiched between the two Bragg mirrors. In the depicted embodiment, the front and back Bragg mirrors are made from 5 and 10 bilayers of TiO2/SiO2, respectively, and the back mirror is grown on a fused silica substrate. FIG. 2(c) shows the reflectivities for the fabricated mirrors according to the embodiment depicted in FIG. 2(a).

The schematic of the full CPA cavity is shown in FIG. 3(a) where it is illuminated by a broadband light source with normal (left) and angled (right) incidence. According to the parameters of the embodiment described in FIG. 2(a)-(c), the expected absorption of the cavity is plotted in FIG. 3(b), implying the resonant absorption at discrete wavelengths for a given angle. In other words, FIG. 3(b) shows the theoretical absorption spectrum of for the normally incident beam (left), and angled incidence (right). The corresponding measured values are depicted in FIG. 3(c). The measurements were taken for angular incidences of 12° to 70°, in increments of 1°. As seen, due to the imperfections in the structure, the resonant features in the real device are "smeared out," resulting in a lesser net cavity absorption (≈60% maximum peak absorption) and a broader absorption linewidth. The impact of the imperfections on the cavity absorption as a function of graphene axial position is discussed below. Moreover, note that at higher wavelength and angles the absorption is vanishing, because the mirror reflectivities start to drop and hence the conditions for CPA are no longer valid. In the experiment with the omniresonant cavity the measurement is limited to 70-nm range rather than 100-nm.

Omniresonant Absorption

Figure 4A:
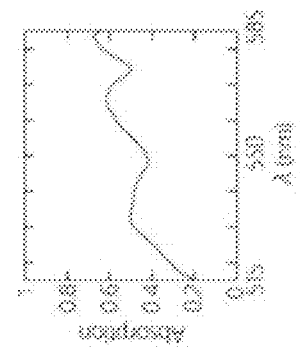
FIG. 4(A) is a diagram of the omniresonant CPA cavity.

Turning now to FIG. 4(a), an schematic representation of an experimental arrangement of the cavity configuration, according to an embodiment, is shown. The incoming broadband beam is a white light emitting from a halogen source (Thorlabs, QTH10/M), which is spatially filtered by coupling through a 1-m-long multimode fiber (50-μm-diameter) and then collimated via a fiber collimator. A grating (Thorlabs GR25-1850) is placed at ~30 cm from the collimator and orientated at 50° with respect to the incident light, providing a linear dispersion for the wavelength range of interest. Before incidence on the grating, the beam passes through a 1-mm-wide vertical slit. Diffracted light is focused by a lens $L_1$ on the cavity, which is mounted on a rotational stage. The lens is placed 12 cm away from the grating to provide the appropriate angular dispersion for phase-matching of the wave-vector axial component. Light reflected from the cavity (no light is transmitted through the cavity due to the fully reflective back mirror) is collimated by a second 25-mm-focal-length lens $L_2$ and then coupled directly to a CCD image sensor. (In other words FIG. 4(a) shows a collimated wideband source polarized and then spatially dispersed with a diffraction gating to form an angle-wavelength correlation, and a lens, L1, modifies the dispersion to achieve omniresonance. The reflected light is collected with a CCD detector.)

Since the light diffracted by the grating is spread horizontally, transversal displacements of optical components can spectrally shift the resonances. Therefore, to ensure a proper optical alignment and getting the desired spectral range, the central wavelength of $\lambda_c=550$ nm is defined as the optical axis which passes through the center of the lenses $L_1$ and $L_2$. The cavity is then mounted on the rotational stage at the focal point of the lens. Although axial displacement of the resonator does not affect the resonances, it can alter the angular distribution of the beam after $L_1$, a feature we use to fine-tune the bandwidth of the resonances. The reflected beam at any given cavity tilt angle is collected with a third lens with a focal length of 5-cm and then is captured in a CCD sensor with 5-μm pixel size. To assign pixels at the CCD to a wavelengths, a tunable narrowband filter (≈3-nm) is used right after each reflection measurement, and it is assumed the variation of wavelength on the CCD is linear. The role of the CCD is to transform the spatial dispersion to the wavelength dispersion.

Figure 4B:
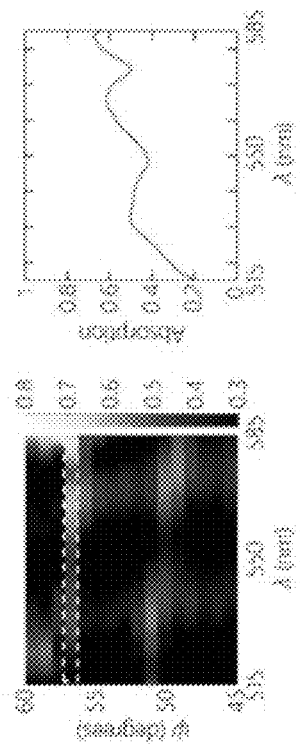
FIG. 4(B) is a graph of the omniresonant CPA cavity.
Figure 4C:
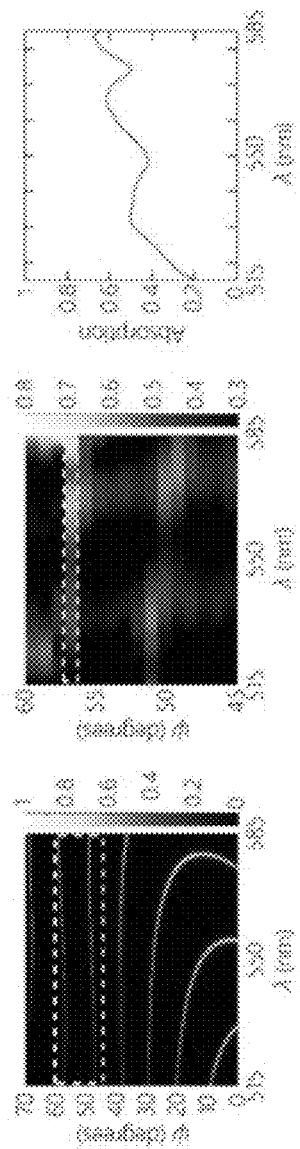
FIG. 4(C) is a graph of the omniresonant CPA cavity.
Figure 4D:
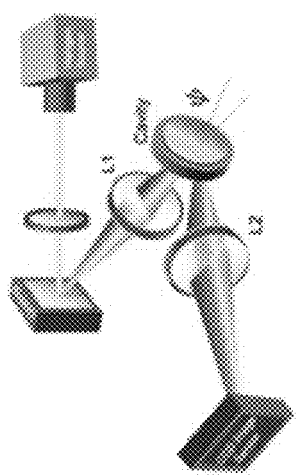
FIG. 4(D) is a graph of the omniresonant CPA cavity.

The absorption spectrum for the setup described in FIG. 4(a) is depicted in FIG. 4(b) for a wide range of cavity tilt angles. As seen, the omniresonance phenomenon emerges at particular tilt angles, i.e., ψ≈50° and ≈60°. (In other words, FIG. 4(b) shows the simulated result for absorption as a function of the cavity tilt angle ψ. The angle is defined as the incidence angle for the wavelength λ=550 nm. The highlighted part indicates angles from 45 to 60 degrees where the experimental measurement is performed. The measurement results are shown in FIG. 4(c). Due to technical limitations in the collection setup, performing the experiment at tilt angles <45° was not possible; thus the tilt angle is limited from 45° to 65°, after which the mirror reflectivities significantly deviated from the assumed values. The measurement indicates the existence of a prominent wideband absorption at the tilt angle ψ=57°. The highlighted part in FIG. 4(c) at the angle of 57 degrees corresponds to the omniresonant CPA. The corresponding spectrum at this tilt angle (57 degrees) is plotted in FIG. 4(d). Comparing this plot with FIG. 3(c), the effect of pre-conditioned beam on the resonance broadening is proved to be very striking.

The embodied invention exploits the concept of assigning any given wavelength component of a broadband beam to a proper incidence angle on the CPA cavity, such that it becomes resonating within the cavity at the corresponding angle. Constructing such an angle-wavelength correlation is shown to be viable through a combination of a diffraction component (e.g., one or more gratings) and a lens with properly devised parameters. We demonstrated that the ≈3-nm linewidth of absorption from a normally incident configuration is broadened to a ≈70-nm resonant bandwidth. Such an effect is a very important step to advancement of the CPA to energy harvesting technologies. The proposed omniresonant arrangement can be integrated on a thin multilayer film. Thus it paves the way for future highly-efficient solar cell devices with micron-size building blocks.

Method for Obtaining Achromatic Resonances

The present invention also includes a method for inducing achromatic resonance in an absorbing cavity with a diffraction system tailored for the laboratory environment (see FIGS. 4(a)-(d)). However, the equations and methodology described herein are applicable to being implemented in planar multi-grating configurations. In particular, in a computing model, the effect of the grating and lens $L_1$ placed in the path of a collimated broadband beam, as shown in FIGS. 4(a)-(d), can be simulated.

Figure 5:
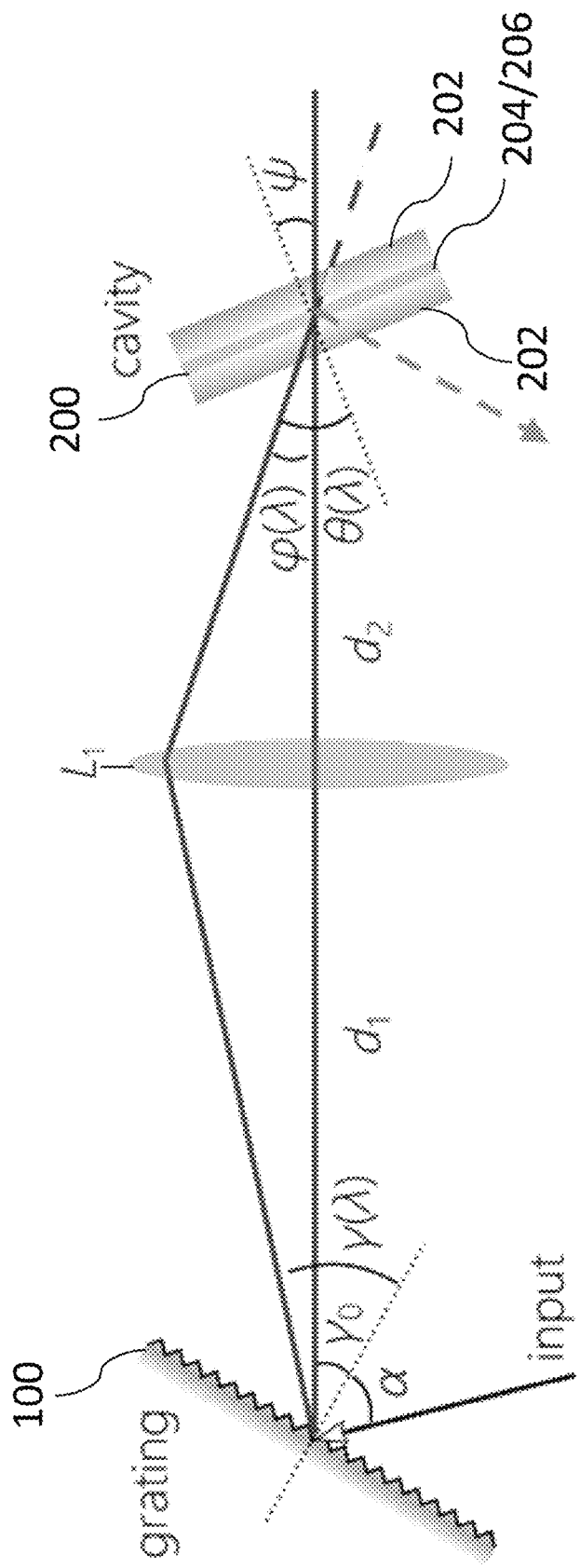
FIG. 5 is a schematic diagram of the angular configuration of the grating and the cavity.

The method operates under the assumption that an ideal light diffracting component (e.g., grating) 100 with TE or TM polarized collimated light directed at an incidence angle α=50° with respect to the normal to the grating 100. FIG. 5 shows a schematic of the setup that highlights the definition of the relevant angles for analysis. (α and γ(λ) are measured with respect to the normal to the grating 100. The optical axis (shown in green) coincides with $\gamma o = (\lambda c = 550$ nm). ($\lambda$) is measured with respect to the optical axis, while $\theta(\lambda)$ is measured from the normal to the cavity 200: $\theta(\lambda) = \varphi(\lambda) + \psi$, where $\psi$ the tilt angle of the cavity with respect to the optical axis). The angularly dispersed light from the grating is then directed to the sample through the lens $L_1$. We assume that 550 nm is the central wavelength and take it to define the optical axis. The tilt angle of the sample $\psi$ is measured with respect to this optical axis. We define the angle $\gamma^{(\lambda)}$ as the diffraction angle with respect to the grating normal. The central wavelength $\lambda_c = 550$ nm is diffracted at $\gamma_o = \gamma(\lambda_c = 550$ nm) and coincides with the optical axis. The angle any wavelength makes with respect to this optical axis is $\gamma^{(\lambda)} - \gamma_o$. This angle is boosted via the lens $L_1$ by a ratio $$\frac{d_1}{d_2},$$

where $d_1$ and $d_2$ are the distances from the grating to $L_1$ and from $L_1$ to the cavity, respectively. The incidence angle made by a wavelength $\lambda$ after the lens with respect to the optical axis is thus:

$$\varphi(\lambda) = \tan^{-1}\left\{\frac{d_1}{d_2}\tan(\gamma(\lambda) - \gamma_o)\right\}$$

with $\varphi_o = \varphi(\lambda_c = 550$ nm$) = 0$. The distances $d_1$ and $d_2$ are selected such that the illuminated spot on the grating 100 is imaged onto the cavity 200. If the focal length of $L_1$ is $f$, then $$d_2 = \frac{fd_1}{f - d_1}.$$

When the cavity 200 is oriented such that it is perpendicular to the optical axis, the angle of incidence of each wavelength is $\varphi^{(\lambda)}$. Upon tilting the cavity 200 by $\psi$, the angle of incidence with respect to the normal to the cavity 200 is $\theta(\lambda) = \varphi(\lambda) + \psi$. See FIG. 4(*b*) for the calculated achromatic spectral-angular absorption and reflection from the FP cavity 200.

Figure 6:
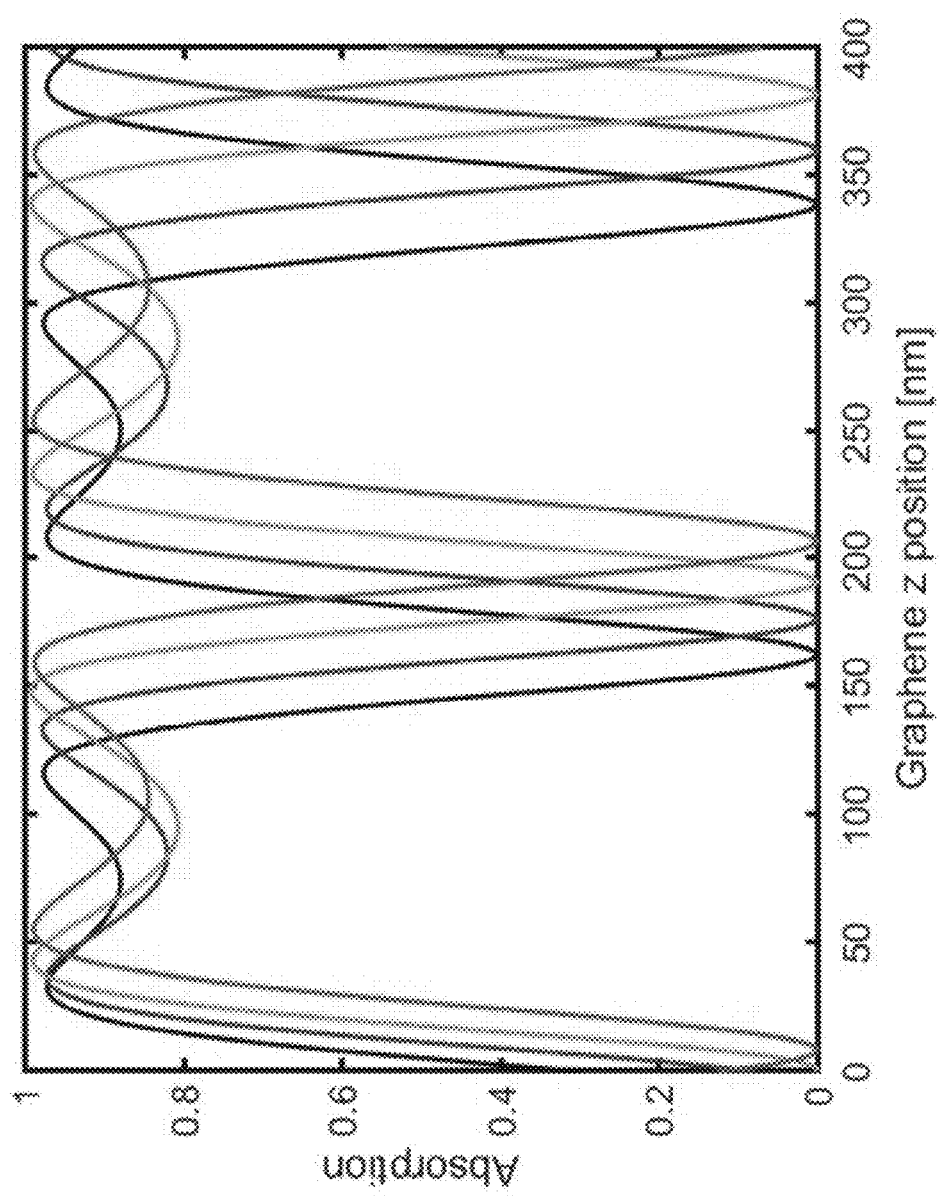
FIG. 6 is a graph of graphene resonant absorption as a function of z.
Figure 7:
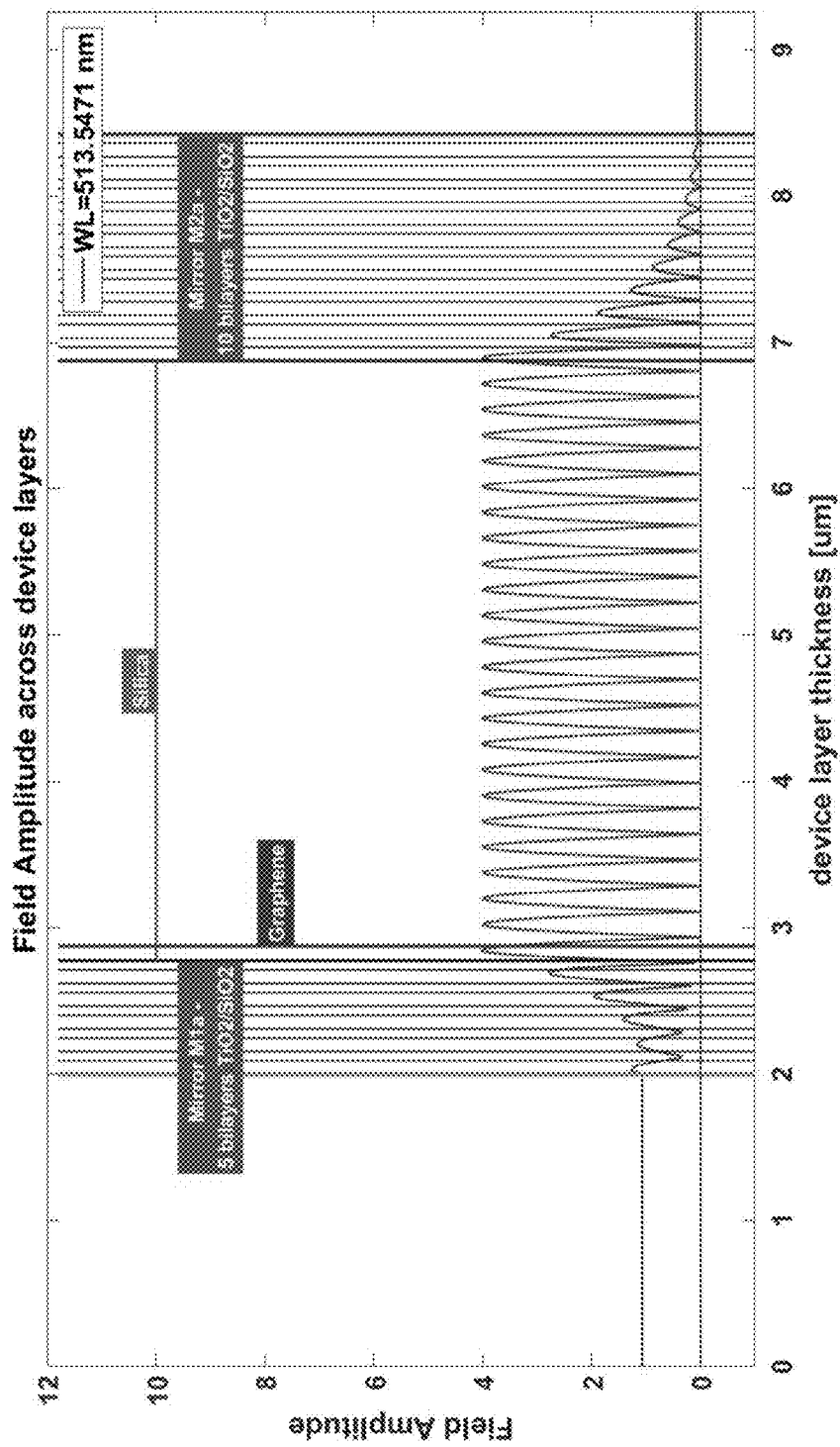
FIG. 7 is a graph of the electric field amplitude across cavity layers.

The four CPA absorption resonance peaks shown in FIGS. 3(*a*)-(*c*) above occur respectively at the following wavelengths: 513.5 nm (blue), 533.5 nm (red), 555.6 nm (green), and 579.3 nm (magenta). The spectral simulation in FIG. 6 calculates the variation in the magnitude of the four absorption peaks as a function of the position of the graphene film along the z-axis. (FIG. 6 shows graphene resonant absorption as function of z for the following parameters: Cavity with 2× mirrors and $SiO_2$ (z) nm/Graphene–0.35 nm/$SiO_2$ (4100-z) nm, absorption at CPA resonance.). This calculation shows that the location of the graphene film along the z-axis of the dielectric has a significant impact on the magnitude of the CPA resonance peaks. This effect is due to the high absorption combined with the extreme thinness of the graphene film (one atom lattice distance) as compared with the size of the photonic electric field distribution within the dielectric, as calculated in the spectral simulation of FIG. 7 for the resonance peak at 555.6 nm. FIG. 7 shows the electrical field amplitude across cavity layers.

It can be shown that the periodicity of the maximum magnitude of the resonance peaks along the z-axis $$\frac{\lambda}{2n_L} \approx 190 \text{ nm.}$$

Accordingly, a protective layer (spacer) behind the front mirror allows us to optimize the CPA resonance peaks. Specifically, a 100 nm spacer optimizes all four resonances, but a smaller, or slightly larger spacer could have a larger effect on two resonances.

The plot of the electric field amplitude in FIG. 7 also shows that the resonances disappear as the field approaches zero intensity.

The broad spectral flattening of the graphene absorption displayed in the experimental results of FIGS. 4(*a*)-(*d*) proves the prediction of the theoretical simulation of our design to achieve achromatic resonances. In the course of our analysis we have also determined that CPA in a monolayer of graphene is highly dependent of its position within the dielectric in the cavity, to the extent that its effect can be completely erased if the film placement coincides with the minima of the electric field standing wave within the cavity.

Omniresonant Transmission in an Optical Micro-Cavity

An aspect of the present invention is a method for achromatic transmission through a planar Fabry-Perot micro-cavity—not by modifying its structure, but instead by altering the spectral-spatial configuration of the incident optical radiation using linear optical components. The spatial degree-of-freedom of the optical field, when used in conjunction with its spectral degree-of-freedom, altogether obviates the limitations inherent in traditional approaches to constructing a white-light cavity. In place of narrow, well-separated resonant linewidths of a micro-cavity, broadband "achromatic resonances" emerge.

Starting from the curved locus of a cavity resonance in spectral-angular space, the locus is de-slanted through angular multiplexing of incident broadband light. Achromaticity is achieved by establishing a judicious correlation between the wavelengths and their associated incident angles, which results in optical 'clearing' of the cavity. Anomalous angular diffraction—achieved via a bio-inspired grating configuration—engenders the necessary correlation and enables continuous phase-matching of the wave-vector axial component to fulfil the resonance condition over an extended bandwidth. This effect is demonstrated using a planar micro-cavity whose linewidth is ~0.7-nm-wide and FSR is ~25 nm. Single-order ~60-nm-wide resonances that span multiple original FSRs emerge, thereby rendering the resonator transparent and even enabling the formation of an image through it. In principle, such achromatic resonances can be established over an indefinitely wide bandwidth by replacing the grating with an appropriately designed metasurface.

Figures 8A, 8B, 8C, 8D:
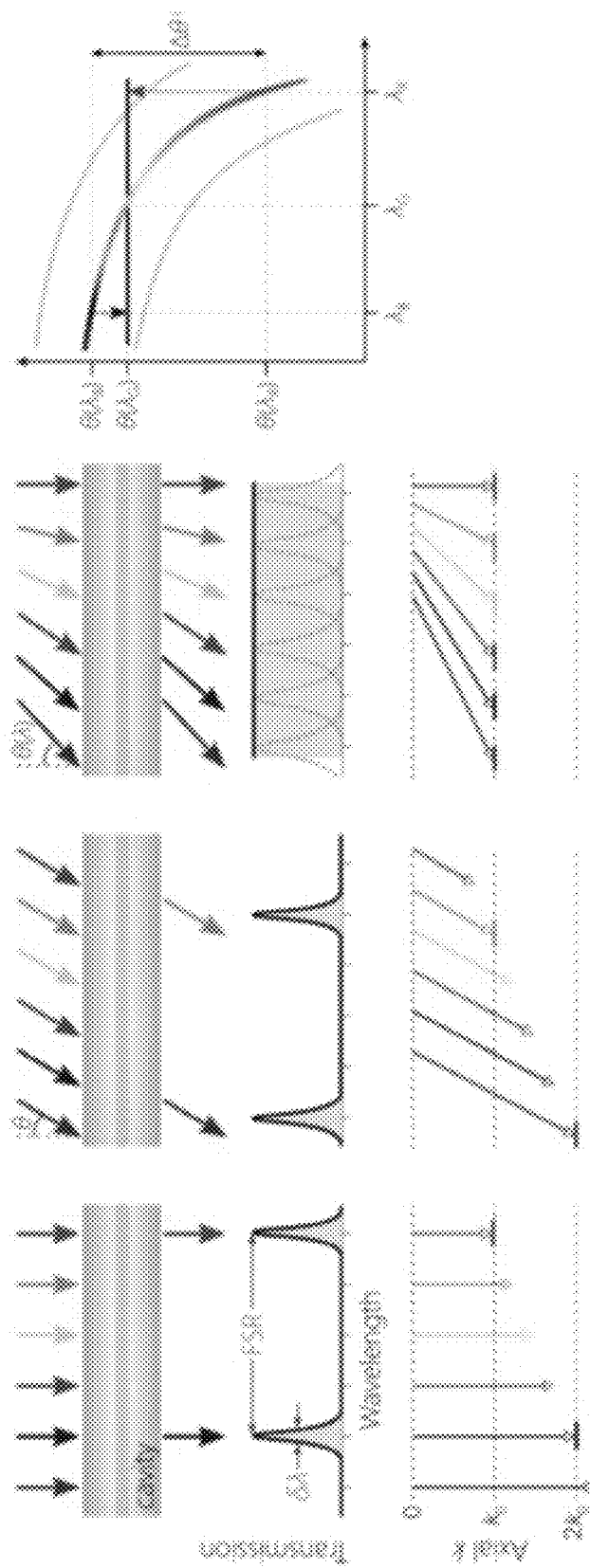
FIG. 8(A) is a graph of spectral-angular correlations producing achromatic resonances in a micro-cavity.
FIG. 8(B) is a graph of spectral-angular correlations producing achromatic resonances in a micro-cavity.
FIG. 8(C) is a graph of spectral-angular correlations producing achromatic resonances in a micro-cavity.
FIG. 8(D) is a graph of spectral-angular correlations producing achromatic resonances in a micro-cavity.

The underlying physical principle for realizing achromatic resonances in a planar Fabry-Pérot cavity can be understood by referring to FIGS. 8(*a*)-(*d*). At normal incidence (FIG. 8(*a*)), only discrete wavelengths resonate whose associated roundtrip phase $\varphi$ is an integer multiple of $2\pi$, $\varphi(\lambda) = 2nkd + 2\gamma(\lambda) = 2\pi m$; here $\lambda$ is the free-space wavelength, $k = 2\pi/\lambda$ is the wave number, d and n are the thickness and refractive index of the cavity layer, respectively, integer m is the resonant-mode order, and $\gamma$ is the reflection phase from the cavity mirrors (assumed symmetric). In other words, when collimated broadband light is incident normally on a planar Fabry-Pérot cavity (FIG. 8(*a*), top row), only a discrete set of wavelengths transmit (FIG. 8(a), middle row) whose axial component of the wave vector inside the cavity is an integer multiple of $k_o=\pi/d$ (identified by solid horizontal dashes in FIG. 8(a), bottom row) ($\delta\lambda$ is the resonance linewidth). At an incidence angle θ, the resonances are blue-shifted (FIG. 8(b)) because only the axial component of the wave vector contributes to the phase $\varphi(\lambda,)=2nkd\cos\theta'+2\gamma(\lambda,\theta')=2\pi m$, where θ' is the angle inside the cavity corresponding to an external angle θ through Snell's law. Indeed, for every wavelength λ, there is an angle (λ) that enables this particular wavelength to resonate by satisfying the phase-matching condition:

$$\varphi(\lambda,\theta)=2nkd\cos[\theta'(\lambda)]+2\gamma(\lambda,\theta')=2\pi m. \quad \text{Equation (1)}$$

Therefore, by re-organizing the incident broadband radiation by assigning each wavelength λ to an appropriate incidence angle (λ), all the angularly multiplexed wavelengths can resonate simultaneously (FIG. 8(c)) with shorter wavelengths requiring larger incidence angles. Thus, transmission becomes achromatic. Hence, one resonant order can extend here over a bandwidth exceeding the FSR. In other words, by providing a pre-compensation tilt angle to each wavelength prior to incidence, such that k cos[θ'(λ)] is constant, the resonance is effectively de-slanted by maintaining $\varphi(\lambda,\theta)$ independent of λ (the horizontal line in FIG. 8(d)). (FIG. 8(d)) shows the locus of resonant orders in spectral-angular space. As described above, by fixing the angle of one wavelength $\theta(\lambda_G)$, the resonance of a specific order (colored curve) is de-slanted by boosting and reducing a pre-compensation angle for each wavelength to produce an achromatic resonance (solid horizontal line). An angular spread Δθ at the input is required to de-slant the resonance between $\lambda_B$ and $\lambda_R$. At the shorter wavelength $\lambda_B$, the incidence angle needs to be increased above $(\lambda_G)$ by $(\lambda_B)-\theta(\lambda_G)$. The longer wavelength $\lambda_R$ requires an incidence angle lower than $(\lambda_G)$ by $(\lambda_G)-\theta(\lambda_R)$. Consequently $\lambda_R$, $\lambda_G$, and $\lambda_B$ all satisfy the resonance condition).

Turning now to FIGS. 9(a)-(e), there are diagrams and graphs showing the concept of angularly multiplex phase-matching to produce achromatic resonance. FIG. 9(a) shows the concept for construction of an optical system that de-slants a resonance in spectral-angular space. FIG. 9(a) shows that by use of an appropriate 'black-box' system correlating λ with θ (as in FIG. 8(c)), a planar micro-cavity is rendered transparent. The inverse of this system is placed after the cavity to restore the original beam. A 'black box' system that implements any of the targeted correlations θ(λ) shown in FIG. 9(b) will enable a broadband beam to transmit through the cavity via angular multiplexing—with all the wavelengths resonating simultaneously—and then its inverse restores the original beam. In particular, in FIG. 9(b), the solid curves are target correlations between λ and θ that help de-slant different resonant mode-orders in a planar micro-cavity (corresponding to the highlighted resonances in FIG. 10(d)). The dashed curve corresponds to the correlation imparted to a collimated broadband beam centered at $\lambda_c=550$ nm that is incident normally on a planar surface grating having 1800 lines/mm.

Dispersive prisms do not provide the required angular spread, and planar surface gratings produce the opposite correlation: longer wavelengths diffract at larger angles with respect to the normal as a consequence of transverse phase-matching (dashed curve in FIG. 9(b)). In other words, the spatial-spectral dispersion inculcated by an optical grating and by a cavity two of the most fundamental optical devices—are in opposition. Instead, so-called 'anomalous diffraction' or 'reverse-color sequence' is required.

To address this challenge, inspiration is derived from the reverse-color sequence observed in the diffraction of white light off the wing scales of the butterfly Pierella luna. This effect has been revealed to be geometric in nature: 'vertical' micro-gratings that grow on the Pierella luna scales reverse the sequence of diffracted colors as confirmed by fabricated artificial counterparts. This strategy is adopted here in reflection mode and vary the relative tilt between the grating and the cavity, from 0° in FIG. 9(c) to 90° in FIG. 9(d), to enable a transition from normal to anomalous diffraction, respectively. FIGS. 9(c)-(d) show the angular diffraction resulting from a planar surface grating parallel (FIG. 9(c)) and normal (FIG. 9(d)) to the plane of a cavity. The former configuration produces the grating curve in (FIG. 9(b)) when α=0.

To gain insight into the resonance de-slanting procedure, the spectral-angular variation in the axial wave-vector component $k_z$ of broadband light propagating in a 'bulk' planar layer of refractive index n is examined. Consider a bandwidth Δλ centered at $\lambda_c$ and each wavelength directed at a different angle (λ), with $\theta(\lambda_c)=\psi$, such that the beam occupies an angular spread Δθ (assume the wavelengths are distributed uniformly around ψ). For a wavelength λ incident at an external angle θ, $k_z$ in the layer is:

$$k_z(\lambda,\psi;\beta)=2\pi/\lambda[n^2-\sin^2[\psi-\beta(\lambda-\lambda_c)]]^{1/2}, \quad \text{Equation (2)}$$

where $\beta=\Delta\theta/\Delta\lambda°/nm$ is the angular dispersion, we take n=1.5 and $\lambda_c=550$ nm, and we ignore the spectral variation of n for simplicity. A region in (λ,) space where $k_z$ is independent of λ is searched for. The graph of FIG. 9(e) plots the value of $k_z$ for several values of angular dispersion β. FIG. 9(e) shows calculated (λ,) normalized with respect to $k_c=n2\pi/\lambda_c$ in a planar layer of index n=1.5. The highlighted region in the third panel where β=0.37°/nm is independent of λ and thus can support achromatic resonances. Insets in each panel in FIG. 9(e) depict the corresponding configurations of broadband light incident on the planar layer. In other words, when mirrors sandwich a layer of thickness d, resonances are established whenever $k_z$ is an integer multiple of π/d. Setting β=0, we retrieve the case of collimated light incident on a planar layer at an external angle of incidence ψ. As β increases, the constant-$k_z$ contours display less curvature with respect to λ. At β=0.37°/nm we reach a critical condition where $k_z$ over an extended region in (λ,) space becomes independent of λ. A broadband optical beam prepared in this configuration will transmit through a cavity via achromatic resonances supported in this region. Increasing β further reverses the curvature of the constant-$k_z$ contours with respect to λ, thereby disrupting the achromatic resonances.

This prediction is confirmed for achromatic resonances (shown in FIGS. 10(a)-(d)) utilizing a Fabry-Pérot cavity consisting of a 4-μm-thick layer of $SiO_2$ (n=1.48 at λ=550 nm) sandwiched between two Bragg mirrors each formed of 5 bilayers. Each bilayer comprises 92.2-nm and 65.5-nm-thick layers created by the evaporation of $SiO_2$ and $Ti_2O_3$ (nn=2.09 at λ=550 nm), respectively, to produce a 120-nm-wide reflection band with 92% reflectivity at its center wavelength $\lambda_c\approx550$ nm at normal incidence. The cavity (total thickness≈5.6 μm) is deposited monolithically by electron-beam evaporation on a 0.5-mm-thick, 25-mm-diameter glass slide (FIG. 10(b), inset). (FIG. 10(b) uses the following parameters: $L_1$ and $L_2$ are lenses, OSA: optical spectrum analyzer. Inset is a photograph of the resonator showing strong reflectivity in the visible (cavity sample diameter is 25 mm)). FIG. 10(a) depicts the measured spectral-angular transmission through the cavity obtained using a ~3-mm diameter collimated white-light beam from a halogen lamp revealing the standard behavior of a planar micro-cavity. Upon normal incidence, a finite set of resonant wavelengths are transmitted with a FSR of ≈25 nm, which are blue-shifted with angle of incidence θ. (FIG. 10(a) uses the following parameters: $L_1$ and $L_2$ are lenses, OSA: optical spectrum analyzer. Inset is a photograph of the resonator showing strong reflectivity in the visible (cavity sample diameter is 25 mm)).

Next, the collimated white-light beam is modified to produce the necessary condition to de-slant the resonance locus—without altering the cavity itself in any way. The beam is first spatially filtered through a 1-mm-wide vertical slit (to avoid aliasing of multiple resonance orders) and is then diffracted from a reflective grating with 1800 lines/mm (FIG. 10(b)). The grating produces an angular dispersion of $\beta \approx 0.09°$/nm at $\lambda_c=550$ nm. A grating with ~3500 lines/mm produces the target β, but such a high-density grating has a low diffraction-efficiency in the visible. To enhance β, we add a lens in the path of the diffracted beam before the cavity ($L_1$ in FIG. 10(b)).

The spectral transmission through the Fabry-Pérot cavity with tilt angle ψ is plotted in FIG. 10(c)-(d). It is critical to note that the angle ψ is not the incidence angle of the beam onto the cavity, but is instead simply the tilt angle of the cavity with respect to the central wavelength $\lambda_c=550$ nm that defines the optical axis; each wavelength is in fact incident at its own angle θ(λ). For convenience, the grating is fixed and the cavity is rotated. Using $L_1$ with focal length $f=50$ mm, β is enhanced to 0.13°/nm, and the blue-shift of the resonance loci is boosted (FIG. 10(c)). Reducing the focal length of $L_1$ to $f=25$ mm increases β further and reaches the desired angular/spectral dispersion (corresponding to the third panel in FIG. 9(e)). The resonance loci are now flattened horizontally at specific values of ψ, whereupon all the wavelengths extending across a 60-nm-wide bandwidth—exceeding twice the FSR—resonate simultaneously (FIG. 10(d)), a phenomenon we name achromatic resonance. (Note, the grating and lens $L_1$ realize the target θ(λ) correlation functions in FIG. 9(b) at the three highlighted tilt angles. The measurements in FIG. 10(c) and FIG. 10(d) are obtained for the H polarization in 1° steps for ψ).

As a result of the cavity achromaticity, one may indeed image an object through the cavity with broadband illumination. A lens is added to the setup in FIG. 10(b) to image a plane preceding the grating to a plane lying beyond the cavity. The object is a binary-valued 0.25×2 $mm^2$ transparency of the letter 'i' that is imaged through the cavity with a magnification factor of ~3. In absence of the grating, a limited amount of light is transmitted through the cavity at any incident angle due to the large FSR and narrow linewidth of the resonances lying within the cavity mirror bandgap (FIG. 11(a)-(b))—when compared to the configuration where the cavity is absent (FIG. 11(c)). In presence of the grating that renders the cavity transparent, a substantial amount of light is transmitted when the cavity tilt angle corresponds to that of an achromatic resonance: at ψ=30°, 39°, 48°, and 57° (FIGS. 11(a) and (d)).

Figure 11A:
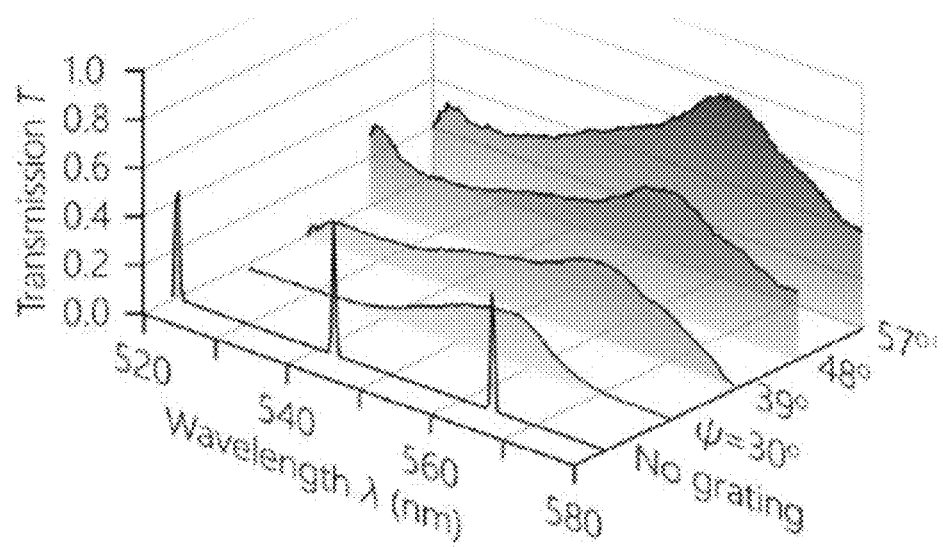
FIG. 11(A) is a graph of imaging through cavity resonances.
Figure 11B:
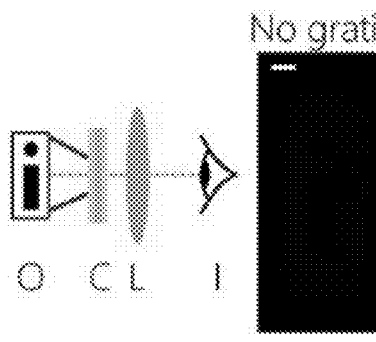
FIG. 11(B) is a diagram of imaging through cavity resonances.
Figure 11C:
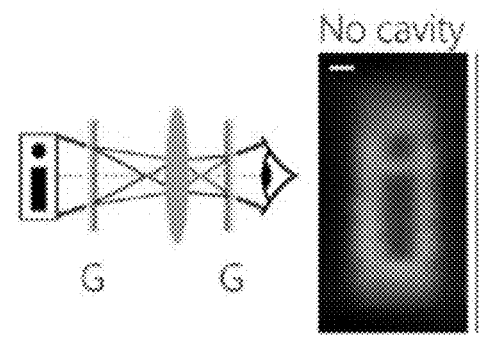
FIG. 11(C) is a diagram of imaging through cavity resonances.
Figure 11D:
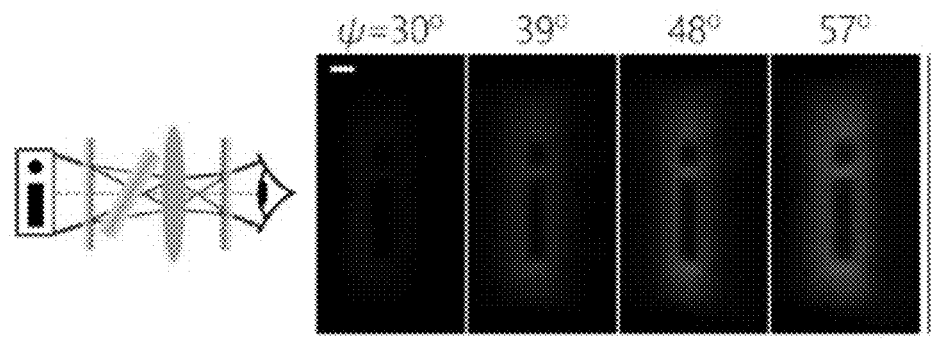
FIG. 11(D) is a diagram of imaging through cavity resonances.

In particular, FIG. 11(a) shows the measured spectral transmission for the achromatic resonances highlighted in FIG. 9(d). The measured bare-cavity normal-incidence transmission (in absence of gratings) is also plotted. FIG. 11(b) shows the imaging of an object through the cavity. The image is not visible because light is transmitted only through narrow resonances corresponding to the 'No grating' condition in FIG. 11(a). FIG. 11(c) shows the imaging an object in absence of the cavity. All of the source spectrum contributes to the image in FIG. 11(c). FIG. 11(d) shows the imaging of an object through achromatic resonances at the angular settings depicted in FIG. 11(a). On the left of the panels in FIGS. 11(b)-(d) the imaging configuration is shown, and on the right, the CCD image is displayed (scale bars are all 250 μm. O: object plane, C: cavity, L: imaging lens, I: image plane (location of the CCD camera), G: grating). The CCD camera gain is held fixed throughout the measurements.

The proof-of-principle experiment renders transparent a micro-cavity with 0.7-nm-wide resonances separated by an FSR of ~25 nm, thanks to an achromatic resonance operating continuously over a broad spectrum (~60 nm). Although the necessary correlation between wavelength and incidence angle is introduced using a planar surface grating, the bandwidth can be broadened further and the uniformity of the spectral transmission improved by replacing the grating with a metasurface realizing a customized function θ(λ) that takes into account the cavity mirror spectral phase γ(λ,θ), its polarization dependence, and wavelength dependence of the refractive index. Furthermore, such a metasurface may indeed implement the reverse-color sequence without introducing a tilt angle with respect to the cavity. Consequently, depositing the metasurface directly on the planar micro-cavity may potentially result in ultra-thin optical devices that deliver resonant linear and nonlinear behavior over extended bandwidths.

Accordingly, the above description introduces a general principle that lifts the bandwidth restrictions associated with resonant linewidths in an optical micro-cavity leading to the realization of an achromatic or white-light cavity. While recent work has exploited spectral splitting of the solar spectrum to optimize the photovoltaic conversion with multiple semiconductor junctions, our approach—on the other hand—implements a continuous mapping to a wavelength-dependent angle of incidence θ(λ). Indeed, the present invention extends to the continuum the correlations between discretized optical degrees of freedom previously studied. As a result, the advantages associated with a resonance—such as field enhancement through resonant buildup and enhanced optical nonlinearities—become altogether decoupled from the cavity linewidth and are thus available over orders-of-magnitude larger bandwidths. This concept can have a profound impact on optics by bringing coherent perfect absorption to bear on harvesting solar energy, producing white-light micro-lasers, and yielding broadband resonantly enhanced nonlinear optical devices.

Structure of the Fabry-Pérot Cavity

A component of the present invention is a Fabry-Pérot micro-cavity optical resonator includes two multi-layer thin-film dielectric mirrors and a lossy, optically absorbing interface disposed between the mirrors. Non-limiting examples of such an optical resonant cavity are disclosed in commonly owned patent U.S. Pat. No. 9,740,031, the subject matter of which is incorporated herein by reference in its entirety. The '031 patent discloses apparatus and methods that enabled coherent perfect absorption (CPA) in a structure, but only at discrete frequencies satisfying a resonance condition. Apparatus, irrespective of the material from which it is constructed, and methods that enable achromatic CPA have many benefits and advantages. For example, achromatic CPA can extend the salutary benefits accrued upon interaction with a resonance such as resonant field buildup for enhancement of linear and nonlinear optical effects over broad bandwidths in ultrathin devices. The '031 patent provides for an apparatus or system (and associated methods) which essentially includes a white light diffraction component optically coupled to a CPA optical cavity.

Figure 12A:
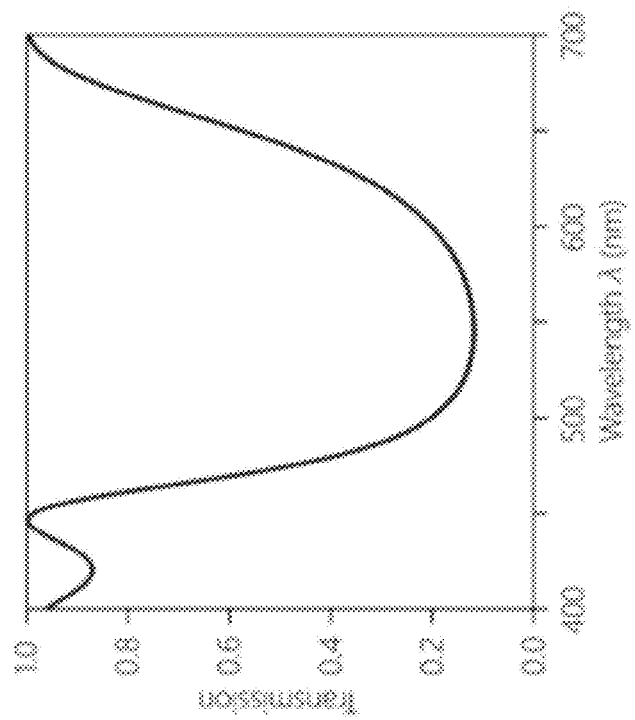
FIG. 12(A) is a graph showing the spectral transmission through the 5-bilayer Bragg mirror at normal incidence.
Figure 12B:
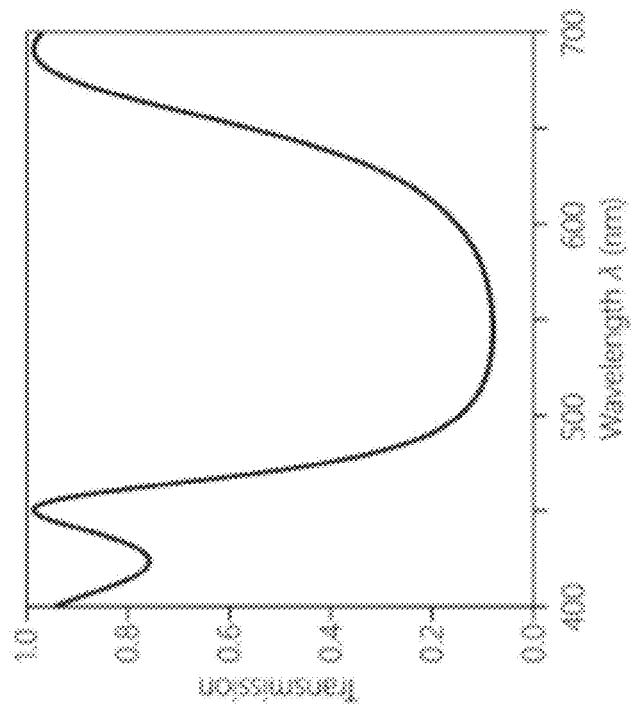
FIG. 12(B) is a graph showing the spectral transmission through the 5-bilayer Bragg mirror at normal incidence.
Figure 15:
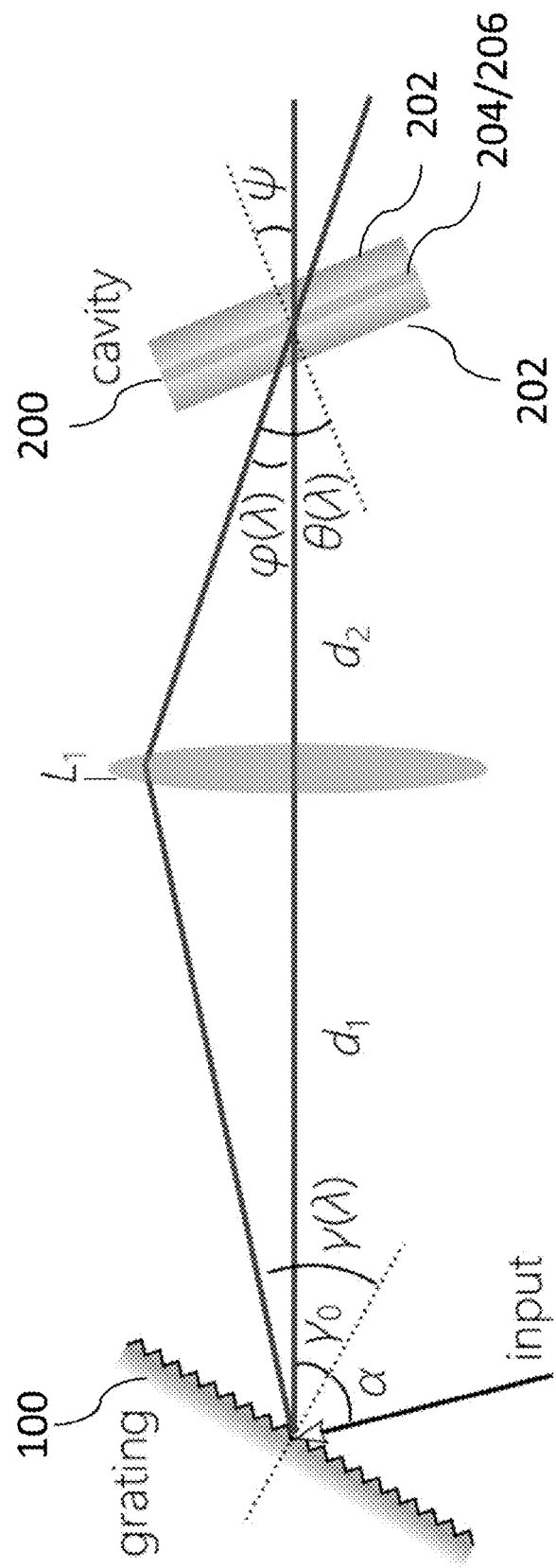
FIG. 15 is a schematic diagram of the angular configuration of the grating and the cavity.

In one embodiment, the planar Fabry-Pérot (FP) cavity 200 used is composed of two symmetric 5 bilayer Bragg mirrors 202 enclosing a 4-μm-thick $SiO_2$ dielectric spacer 204 (on a BK7 substrate 206) (as shown in FIG. 15). FIG. 12(*a*) shows the spectral transmission through the 5-bilayer Bragg mirror at normal incidence where the mirror is surrounded by glass on one side and air from the other. FIG. 12(*b*) shows the spectral transmission through the 5-bilayer Bragg mirror at normal incidence where the mirror is surrounded by glass on both sides. The overall structure thus has the layered form:

Incidence→Air-$(HL)_5$-$SiO_2$-$(LH)_5$-BK7.

Figure 13:
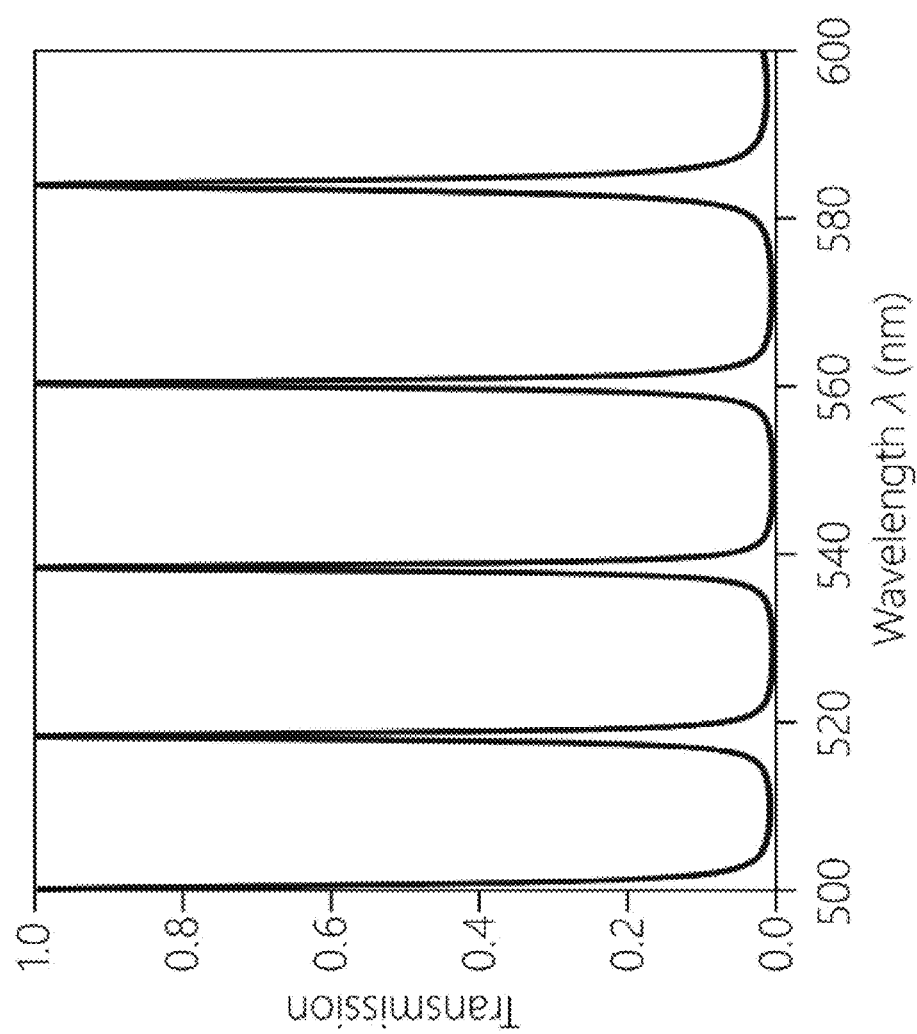
FIG. 13 is a graph of the spectral transmission through the FP cavity at normal incidence.
Figure 14B:
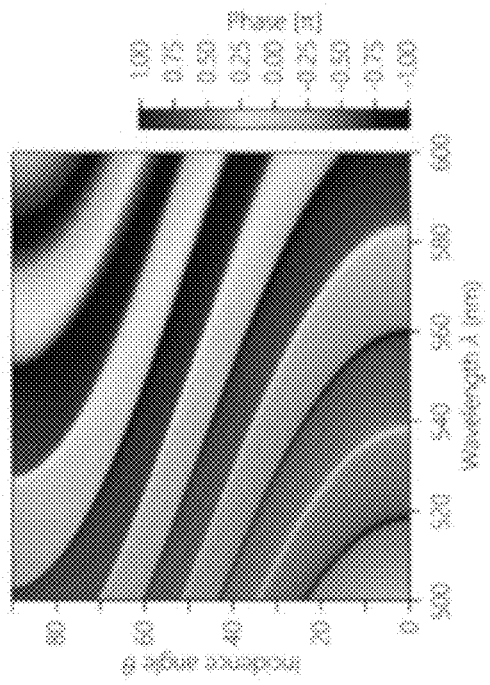
FIG. 14(B) is a graph showing the spectral-angular transmission through and reflection from the FP cavity for incidence of the TE polarization from air.
Figure 14D:
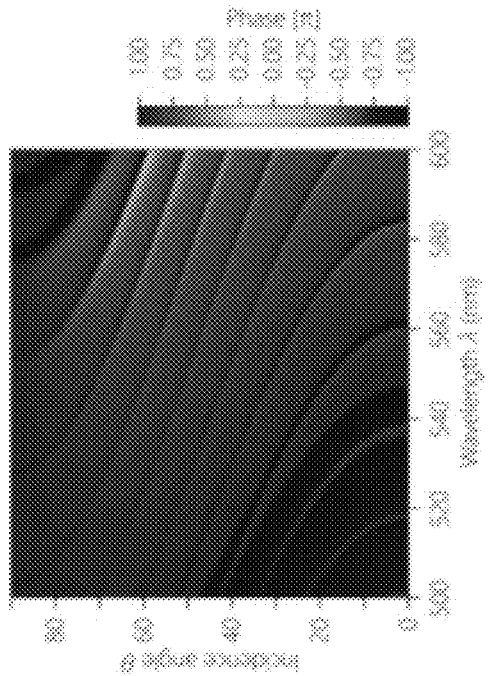
FIG. 14(D) is a graph showing the spectral-angular transmission through and reflection from the FP cavity for incidence of the TE polarization from air.
Figure 14A:
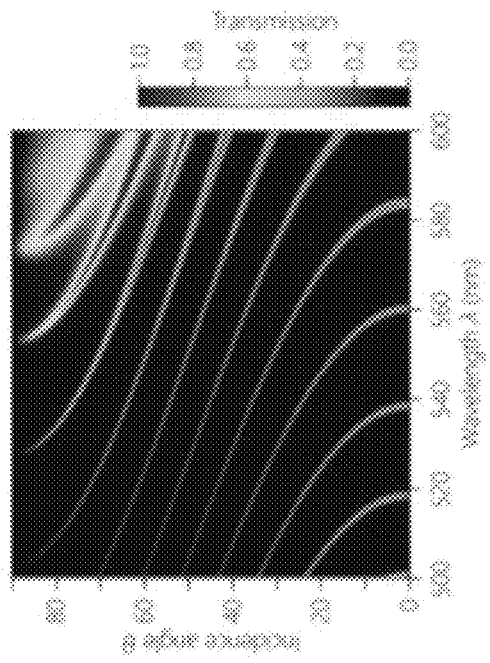
FIG. 14(A) is a graph showing the spectral-angular transmission through and reflection from the FP cavity for incidence of the TE polarization from air.
Figure 14C:
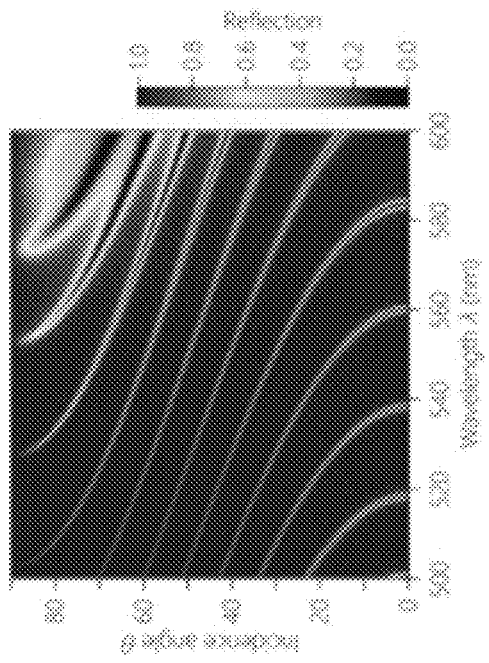
FIG. 14(C) is a graph showing the spectral-angular transmission through and reflection from the FP cavity for incidence of the TE polarization from air.

Here, each bilayer (HL) consists of a high-index (H) and low-index (L) material, which are $TiO_2$ and $SiO_2$, respectively. It is noted, however, that any known non-absorbing materials for making a mirror may be used, as known in the art. The $TiO_2$ films were formed by evaporating $Ti_2O_3$ source material under $O_2$ partial pressure. Using these values in Tables S1 and S2, the spectral response of the full cavity (FIGS. 13-14) is calculated. The spectral simulations employ the transfer matrix method at a resolution of $(\pi/2)/500$. FIG. 13 shows the spectral transmission through the FP cavity at normal incidence where the free spectral range is 25 nm. FIGS. 14(*a*)-(*d*) show the spectral transmission through and reflection from the FP cavity for incidence of the TE polarization from air. FIG. 14(*a*) shows the transmittance amplitude. FIG. 14(*b*) shows the phase as a function of the angle of incidence in the spectral range of the Bragg mirror bandgap (see FIGS. 12(*a*)-(*b*)). FIG. 14(*c*) shows the reflectance amplitude and FIG. 14(*d*) shows the phase.

Simulation of the Achromatic Resonances

The transmission characteristics of the FP cavity 200 when it is inserted into a setup that induces achromatic resonances are calculated. In particular, the effect of the grating 100 (light diffracting component) and lens $L_1$ placed in the path of a collimated broadband beam is simulated, as shown in FIG. 10(*b*).

It is an assumption that an ideal grating with TE or TM polarized collimated light directed at an incidence angle $\alpha=50°$ with respect to the normal to the grating 100. See FIG. 15 for a schematic of the setup that highlights the definition of the relevant angles for analysis. (In FIG. 15, $\alpha$ and ($\lambda$) are measured with respect to the normal to the grating 100. The optical axis (shown in green) coincides with $\gamma_o=(\lambda_c=550$ nm$)$. ($\lambda$) is measured with respect to the optical axis, while ($\lambda$) is measured from the normal to the cavity 200: $(\lambda)=\varphi(\lambda)+\psi$, where $\psi$ is the tilt angle of the cavity with respect to the optical axis). The angularly dispersed light from the grating 100 is then directed to the sample through the lens $L_1$. It is assumed that 550 nm is the central wavelength, which is taken to define the optical axis. The tilt angle of the sample $\psi$ is measured with respect to this optical axis. The angle ($\lambda$), which is the diffraction angle with respect to the grating normal is defined. The central wavelength $\lambda_c=550$ nm is diffracted at $\gamma_o=(\lambda_c=550$ nm$)$ and coincides with the optical axis. The angle any wavelength $\lambda$ makes with respect to this optical axis is $(\lambda)-\gamma_o$. This angle is boosted via the lens $L_1$ by a ratio $d_1/d_2$, where $d_1$ and $d_2$ are the distances from the grating 100 to $L_1$ and from $L_1$ to the cavity 200, respectively. The incidence angle made by a wavelength $\lambda$ after the lens $L_1$ with respect to the optical axis is thus:

$$\varphi(\lambda)=\tan^{-1}[(d_1/d_2)\tan(\gamma(\lambda)-\gamma_o)],$$

with $\varphi_o=\varphi(\lambda_c=550$ nm$)=0$. The distances $d_1$ and $d_2$ are selected such that the illuminated spot on the grating 100 is imaged onto the cavity 200. If the focal length of $L_1$ is $f$, then $d_2=fd_1/f-d_1$. When the cavity 200 is oriented such that it is perpendicular to the optical axis, the angle of incidence of each wavelength is ($\lambda$). Upon tilting the cavity 200 by $\psi$, the angle of incidence with respect to the normal to the cavity 200 is $(\lambda)=(\lambda)+\psi$.

Figure 17B:
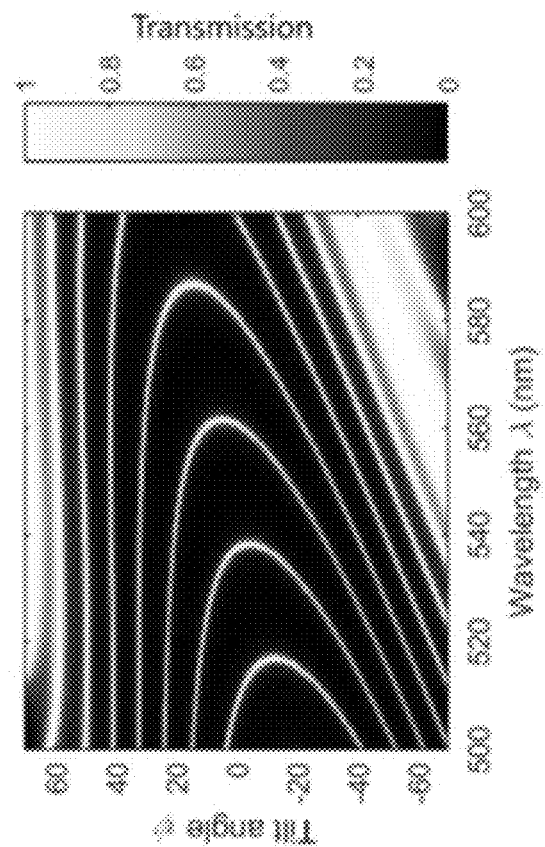
FIG. 17(B) is a graph of FIG. 16(b) for TM polarization.
Figure 17A:
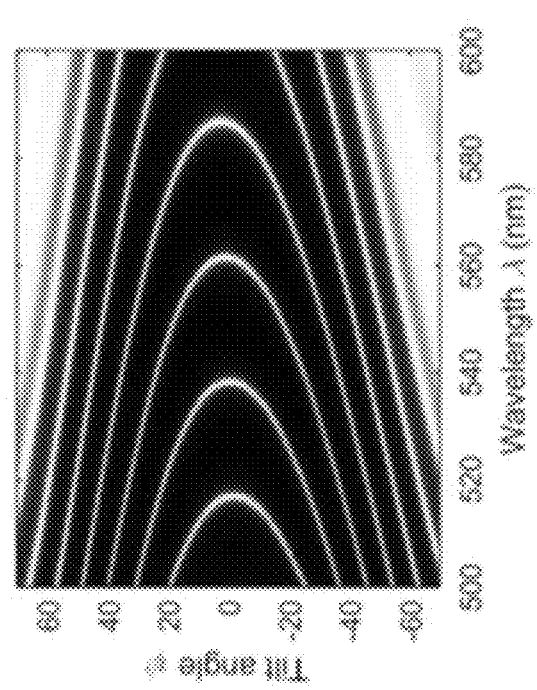
FIG. 17(A) is a graph of FIG. 16(a) for TM polarization.

With these parameters, the transmission through the sample using the transfer matrix method is calculated for both TE (FIGS. 16(*a*)-(*b*)) and TM (FIG. 17(*a*)-(*b*)) polarizations. The calculations are carried out for two values of the focal length, $f=50$ mm (FIG. 16(*a*)) and $f=25$ mm (FIG. 16(*b*)) corresponding to the values used in our experiment. The calculations in FIGS. 16(*a*) and (*b*) are to be compared to the measurements reported in the main text in FIG. 10(*c*) and FIG. 10(*d*), respectively. (Note, FIGS. 16(*a*)-(*b*) and 17(*a*)(*b*) show the spectral transmission through an achromatic resonator for TE and TM polarization, respectively, while varying the cavity tilt angle $\psi$. In FIGS. 16(*a*) and 17(*a*), the focal length of $L_1$ is $f=50$ mm and $d_2=8$ cm. In FIGS. 16(*b*) and 17(*b*), the focal length of $L_1$ is $f=25$ mm and $d_2=12$ cm).

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements.

Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. An omniresonant broadband coherent perfect absorption (CPA) apparatus, comprising:
    a light diffracting component;
    a lens $L_1$; and
    an omniresonant optical cavity, disposed along an optical axis,
    wherein the omniresonant optical cavity is disposed tilted at an angle, $\psi$, with respect to the optical axis,
    further wherein an angle $\gamma(\lambda)$ is a diffraction angle of a white-light input to the diffraction component with respect to a light diffracting component normal,
    wherein $\gamma(\lambda)-\gamma_o$ is the angle that any wavelength $\lambda$ makes with respect to the optical axis,
    wherein $\gamma(\lambda)$ is within a range from 12 degrees to 70 degrees and $\gamma_0$ is within a range from 45 degrees to 65 degrees,
    wherein a central wavelength $\lambda_c$ is diffracted at $\gamma_o=\gamma$ ($\lambda_c$=550 nm) and coincides with the optical axis,
    wherein the incidence angle made by the wavelength $\lambda$ after the lens with respect to the optical axis is $$\varphi(\lambda) = \tan^{-1}\left\{\frac{d_1}{d_2}\tan(\gamma(\lambda)-\gamma_o)\right\},$$

where $d_1$ and $d_2$ are the distances from the light diffracting component to the lens $L_1$ and from the lens $L_1$ to the cavity, respectively, such that the condition $\theta(\lambda)=\varphi(\lambda)+\psi$ is satisfied.

2. The omniresonant broadband CPA apparatus of claim 1, wherein the omniresonant optical cavity comprises an absorbing layer embedded between a CPA-inducing front mirror and a fully reflective back mirror.

3. The omniresonant broadband CPA apparatus of claim 2, wherein the CPA-inducing front mirror and the fully reflective back mirror are bilayer Bragg mirrors.

4. The omniresonant broadband CPA apparatus of claim 1, wherein the light diffracting component is a grating.

5. The omniresonant broadband CPA apparatus of claim 1, wherein a focal length of $L_1$ is f, and $d_2=fd_1/(f-d_1)$.

6. A method for omniresonant transmission, comprising the steps of:
    providing an omniresonant broadband apparatus having a light diffracting component, a lens $L_1$, and an omniresonant optical cavity, disposed along an optical axis,
        wherein the omniresonant optical cavity is disposed tilted at an angle, $\psi$, with respect to the optical axis;
    inputting a white-light input to the diffraction component with respect to a light diffracting component normal having a diffraction angle $\gamma(\lambda)$;
    wherein $\gamma(\lambda)-\gamma_o$ is the angle that any wavelength $\lambda$ makes with respect to the optical axis;
    wherein $\gamma(\lambda)$ is within a range from 12 degrees to 70 degrees and $\gamma_0$ is within a range from 45 degrees to 65 degrees;
    diffracting a central wavelength $\lambda_c$ at $\gamma_o=\gamma(\lambda_c=550$ nm), which coincides with the optical axis;
    wherein the incidence angle made by the wavelength $\lambda$ after the lens with respect to the optical axis is $$\varphi(\lambda) = \tan^{-1}\left\{\frac{d_1}{d_2}\tan(\gamma(\lambda)-\gamma_o)\right\},$$

where $d_1$ and $d_2$ are the distances from the light diffracting component to the lens $L_1$ and from the lens $L_1$ to the cavity, respectively, such that the condition $\theta(\lambda)=\varphi(\lambda)+\psi$ is satisfied.

7. The omniresonant broadband transmission apparatus of claim 6, wherein the omniresonant optical cavity comprises two symmetric bilayer Bragg mirrors with a dielectric spacer therebetween.

8. The omniresonant broadband transmission apparatus of claim 7, wherein the dielectric spacer is composed of $SiO_2$.

* * * * *